United States Patent
DeLuca et al.

(10) Patent No.: US 9,025,054 B2
(45) Date of Patent: *May 5, 2015

(54) DETECTING RED EYE FILTER AND APPARATUS USING META-DATA

(71) Applicant: DigitalOptics Corporation Europe Limited, Galway (IE)

(72) Inventors: Michael J. DeLuca, Boca Raton, FL (US); Yury Prilutsky, San Mateo, CA (US); Eran Steinberg, San Francisco, CA (US); Peter Corcoran, Claregalway (IE); Petronel Bigioi, Galway (IE); Alexei Pososin, Galway (IE)

(73) Assignee: FotoNation Limited, Ballybrit, Galway (IE)

( * ) Notice: Subject to any disclaimer, the term of this patent is extended or adjusted under 35 U.S.C. 154(b) by 0 days.

This patent is subject to a terminal disclaimer.

(21) Appl. No.: 13/771,001

(22) Filed: Feb. 19, 2013

(65) Prior Publication Data
US 2013/0162869 A1 Jun. 27, 2013

Related U.S. Application Data

(63) Continuation of application No. 12/613,457, filed on Nov. 5, 2009, now Pat. No. 8,537,251, which is a continuation of application No. 10/635,862, filed on Aug. 5, 2003, now Pat. No. 7,630,006.

(51) Int. Cl.
*H04N 5/217* (2011.01)
*H04N 5/235* (2006.01)
(Continued)

(52) U.S. Cl.
CPC ............. *H04N 5/357* (2013.01); *H04N 5/217* (2013.01); *G06K 9/0061* (2013.01); *G06T 5/008* (2013.01);
(Continued)

(58) Field of Classification Search
None
See application file for complete search history.

(56) References Cited

U.S. PATENT DOCUMENTS

| | | |
|---|---|---|
| 5,432,863 A | 7/1995 | Benati et al. |
| 5,748,764 A | 5/1998 | Benati et al. |

(Continued)

FOREIGN PATENT DOCUMENTS

| | | |
|---|---|---|
| EP | 1296510 A1 | 3/2003 |
| EP | 1429290 A | 6/2004 |

(Continued)

OTHER PUBLICATIONS

Hiroshi et al. using PTO English translation No. 2009-5746 based on Japanese publication No. JP05-224271 dated Sep. 3, 1993, 12 pages.

(Continued)

*Primary Examiner* — Aung S Moe
*Assistant Examiner* — John H Morehead, III
(74) *Attorney, Agent, or Firm* — Hickman Palermo Truong Becker Bingham Wong LLP

(57) ABSTRACT

A method of filtering a red-eye phenomenon from an acquired digital image including a multiplicity of pixels indicative of color, the pixels forming various shapes of the image, includes analyzing meta-data information, determining one or more regions within the digital image suspected as including red eye artifact, and determining, based at least in part on the meta-data analysis, whether the regions are actual red eye artifact. The meta-data information may include information describing conditions under which the image was acquired, captured and/or digitized, acquisition device-specific information, and/film information.

72 Claims, 9 Drawing Sheets

(51) Int. Cl.

| | | |
|---|---|---|
| H04N 5/228 | (2006.01) | |
| H04N 5/357 | (2011.01) | |
| G06K 9/00 | (2006.01) | |
| G06T 5/00 | (2006.01) | |
| G06T 5/40 | (2006.01) | |
| G06T 7/00 | (2006.01) | |
| G06T 7/40 | (2006.01) | |
| H04N 1/60 | (2006.01) | |
| H04N 1/62 | (2006.01) | |

(52) U.S. Cl.
CPC ............. *G06T 5/40* (2013.01); *G06T 7/0002* (2013.01); *G06T 7/408* (2013.01); *H04N 1/6086* (2013.01); *H04N 1/62* (2013.01); *H04N 1/624* (2013.01); *H04N 5/2354* (2013.01); *G06T 5/005* (2013.01); *G06T 2207/10024* (2013.01); *G06T 2207/30041* (2013.01); *G06T 2207/30201* (2013.01); *G06T 2207/30216* (2013.01)

(56) References Cited

U.S. PATENT DOCUMENTS

| | | | |
|---|---|---|---|
| 5,751,836 A | | 5/1998 | Wildes et al. |
| 6,035,072 A | | 3/2000 | Read |
| 6,134,339 A | | 10/2000 | Luo |
| 6,278,491 B1 | | 8/2001 | Wang et al. |
| 6,335,990 B1 | | 1/2002 | Chen et al. |
| 6,407,777 B1 | | 6/2002 | DeLuca |
| 6,707,950 B1 | | 3/2004 | Burns et al. |
| 6,792,161 B1 | | 9/2004 | Imaizumi et al. |
| 6,816,619 B2 | | 11/2004 | Tlaskal et al. |
| 6,895,112 B2 | | 5/2005 | Chen et al. |
| 6,987,535 B1 | | 1/2006 | Matsugu et al. |
| 7,042,501 B1 | | 5/2006 | Matama |
| 7,042,505 B1 | | 5/2006 | DeLuca |
| 7,099,510 B2 | | 8/2006 | Jones et al. |
| 7,130,453 B2 | | 10/2006 | Kondo et al. |
| 7,289,664 B2 | | 10/2007 | Enomoto |
| 7,352,394 B1 | | 4/2008 | DeLuca et al. |
| 7,403,654 B2 | | 7/2008 | Wu et al. |
| 7,436,998 B2 | | 10/2008 | Steinberg et al. |
| 7,450,737 B2 | | 11/2008 | Ishikawa et al. |
| 7,474,341 B2 | | 1/2009 | DeLuca et al. |
| 7,536,036 B2 | | 5/2009 | Steinberg et al. |
| 7,567,707 B2 | | 7/2009 | Willamowski et al. |
| 7,590,284 B2 | | 9/2009 | Kakiuchi et al. |
| 7,599,519 B2 | | 10/2009 | Yokouchi et al. |
| 7,630,006 B2 | | 12/2009 | DeLuca et al. |
| 7,784,943 B2 | | 8/2010 | Adachi et al. |
| 7,903,870 B1 | | 3/2011 | Budagavi |
| 8,036,460 B2 | | 10/2011 | Nanu et al. |
| 8,379,117 B2 * | | 2/2013 | DeLuca et al. ............... 348/241 |
| 8,493,478 B2 * | | 7/2013 | DeLuca et al. ............... 348/241 |
| 8,520,093 B2 | | 8/2013 | Nanu et al. |
| 8,537,251 B2 * | | 9/2013 | DeLuca et al. ............... 348/241 |
| 8,648,938 B2 * | | 2/2014 | DeLuca et al. ............... 348/241 |
| 2002/0034337 A1 | | 3/2002 | Shekter et al. |
| 2002/0093577 A1 | | 7/2002 | Ichikawa et al. |
| 2002/0093633 A1 | | 7/2002 | Milch |
| 2002/0131770 A1 | | 9/2002 | Meier et al. |
| 2002/0136450 A1 | | 9/2002 | Yan et al. |
| 2003/0004407 A1 | | 1/2003 | Carroll et al. |
| 2003/0009519 A1 | | 1/2003 | Gosling et al. |
| 2003/0014228 A1 | | 1/2003 | Kubota et al. |
| 2003/0044070 A1 | | 3/2003 | Fuersich et al. |
| 2003/0044177 A1 | | 3/2003 | Oberhardt et al. |
| 2003/0071908 A1 | | 4/2003 | Sannoh et al. |
| 2003/0086134 A1 | | 5/2003 | Enomoto |
| 2003/0095197 A1 * | | 5/2003 | Wheeler et al. ............... 348/241 |
| 2003/0142285 A1 | | 7/2003 | Enomoto |
| 2003/0161506 A1 | | 8/2003 | Velazquez et al. |
| 2004/0032526 A1 | | 2/2004 | Silverbrook |
| 2004/0042659 A1 | | 3/2004 | Guo et al. |
| 2004/0174434 A1 * | | 9/2004 | Walker et al. ............... 348/211.3 |
| 2005/0140801 A1 | | 6/2005 | Prilutsky et al. |
| 2005/0276481 A1 | | 12/2005 | Enomoto |
| 2006/0029263 A1 | | 2/2006 | Zhang |
| 2006/0072815 A1 | | 4/2006 | Wu et al. |
| 2006/0204052 A1 | | 9/2006 | Yokouchi |
| 2007/0031028 A1 | | 2/2007 | Vetter et al. |
| 2007/0189609 A1 | | 8/2007 | Ito et al. |
| 2007/0196019 A1 | | 8/2007 | Yamaguchi |
| 2007/0263928 A1 | | 11/2007 | Akahori |
| 2008/0002060 A1 * | | 1/2008 | DeLuca et al. ............... 348/576 |
| 2008/0186389 A1 * | | 8/2008 | DeLuca et al. ............... 348/222.1 |
| 2008/0205712 A1 | | 8/2008 | Ionita et al. |
| 2009/0003661 A1 | | 1/2009 | Ionita et al. |
| 2009/0010501 A1 | | 1/2009 | Ogawa |
| 2010/0053362 A1 | | 3/2010 | Nanu et al. |
| 2010/0053367 A1 | | 3/2010 | Nanu et al. |
| 2010/0053368 A1 | | 3/2010 | Nanu et al. |
| 2011/0102643 A1 | | 5/2011 | Nanu et al. |
| 2012/0038788 A1 * | | 2/2012 | DeLuca et al. ............... 348/222.1 |
| 2013/0033624 A1 * | | 2/2013 | Steinberg et al. ............... 348/241 |

FOREIGN PATENT DOCUMENTS

| | | |
|---|---|---|
| WO | 02/45003 A | 6/2002 |
| WO | 03/071484 A | 8/2003 |
| WO | 2005/076217 A2 | 8/2005 |
| WO | 2005/076217 A3 | 4/2006 |
| WO | 2010/025908 A1 | 3/2010 |

OTHER PUBLICATIONS

Notification of Transmittal of the International Search Report and the Written Opinion of the International Searching Authority, or the Declaration, for PCT Application No. PCT/EP2009/006361, dated Nov. 11, 2009, 10 pages.

PCT Notification Concerning Transmittal of Copy of International Preliminary Report on Patentability (Chapter I of the Patent Cooperation Treaty), for PCT Application No. PCT/EP2009/006361, report dated Mar. 8, 2011, 6 pages.

Gaubatz M, Ulichney R., Automatic red-eye detection and correction, Proceedings / 2002 International Conference on Image Processing: Sep. 22-25, 2002, Rochester, New York, USA, IEEE Operations Center, Piscataway, NJ, vol. 1, Sep. 22, 2002, pp. 804-807, XP010607446 ISBN: 978-0-7803-7622-9.

Final Rejection, dated Dec. 12, 2012, for U.S. Appl. No. 12/038,777, filed Feb. 27, 2008.

Notice of Allowance, dated Nov. 13, 2012, for U.S. Appl. No. 12/437,464, filed May 7, 2009.

Notice of Allowance, dated Nov. 5, 2012, for U.S. Appl. No. 12/790,594, filed May 28, 2010.

Non-Final Rejection, dated Jan. 10, 2013, for U.S. Appl. No. 12/825,280, filed Jun. 28, 2010.

Non-Final Rejection, dated Apr. 3, 2013, for U.S. Appl. No. 12/551,312, filed Aug. 31, 2009.

Final Rejection, dated Aug. 15, 2013, for U.S. Appl. No. 12/941,995, filed Nov. 8, 2010.

Non-Final Rejection, dated Dec. 24, 2012, for U.S. Appl. No. 12/941,995, filed Nov. 8, 2010.

Non-final Rejection, dated Jan. 26, 2012, for U.S. Appl. No. 12/551,282, filed Aug. 31, 2009.

Final Rejection, dated Oct. 27, 2011, for U.S. Appl. No. 12/551,312, filed Aug. 31, 2009.

Non-Final Rejection, dated Jan. 29, 2013, for U.S. Appl. No. 13/351,177, filed Jan. 16, 2012.

Sahba F et al: "Filter fusion for image enhancement using reinforcement learning" CCECE 2003. Canadian Conference on Electrical and Computer Engineering. Montreal, Canada. May 4-7, 2003, Canadian Conference on Electrical and Computer Engineering, New York, NY, IEEE, US. vol. 3 of 3. May 4, 2003. pp. 847-850, XP010654204, ISBN: 0-7803-7781-8.

U.S. Appl. No. 13/787,783, filed Mar. 6, 2013, Office Action.

U.S. Appl. No. 13/235,757, filed Sep. 19, 2011, Final Office Action.

\* cited by examiner

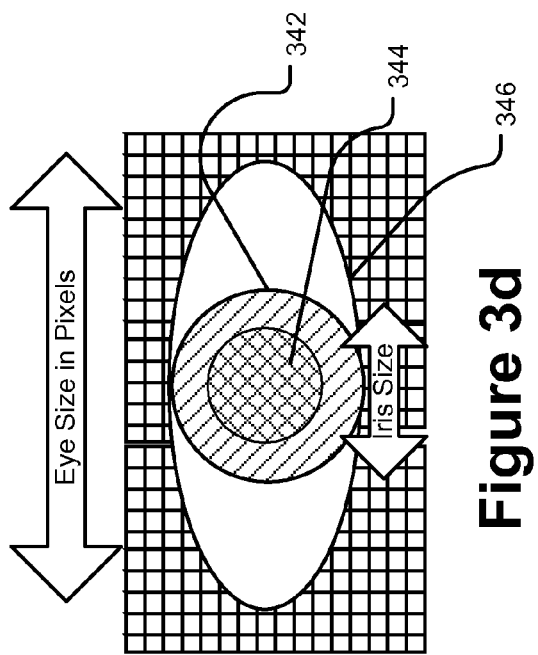
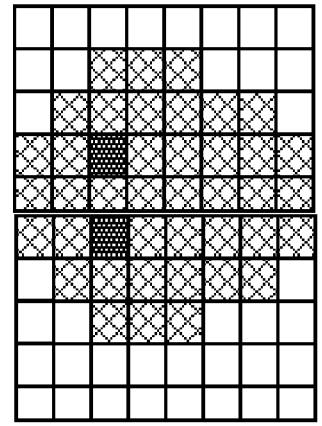
Figure 3d
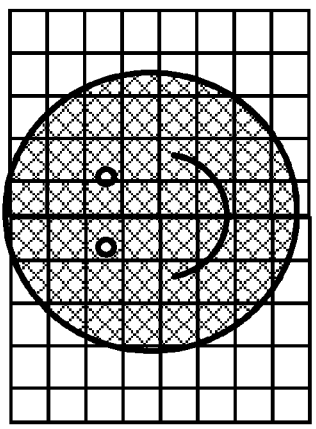
Figure 3c
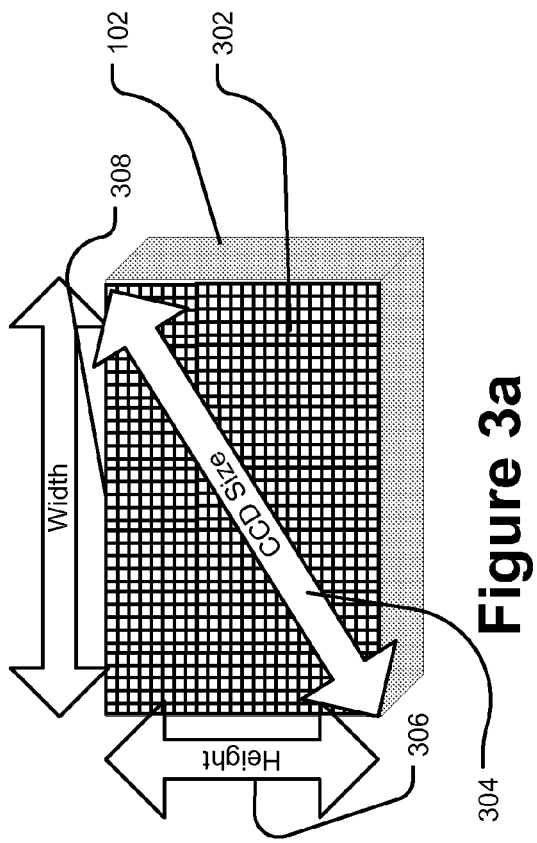
Figure 3a
Figure 3b

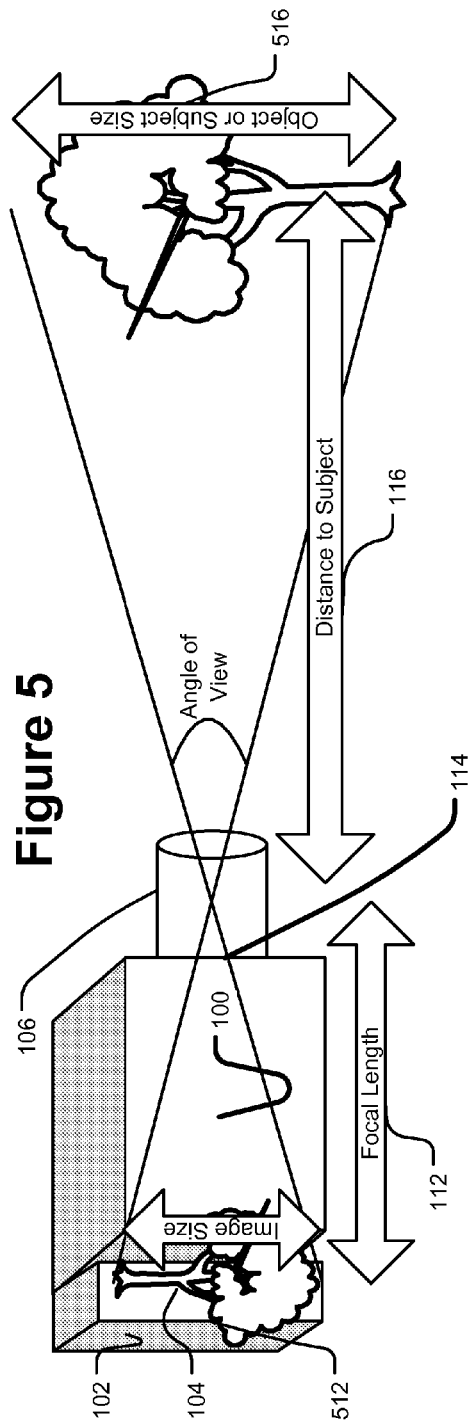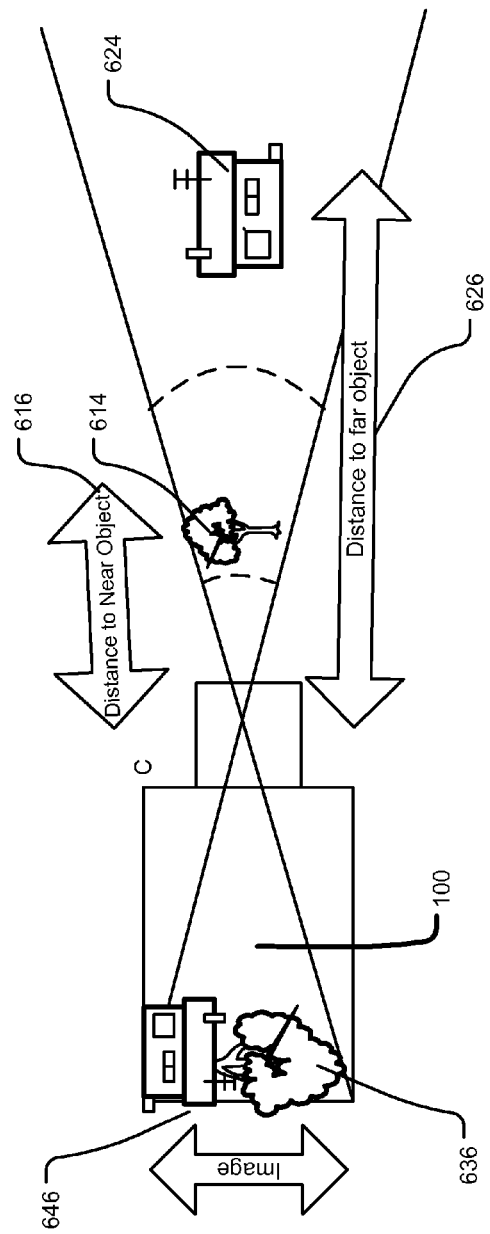

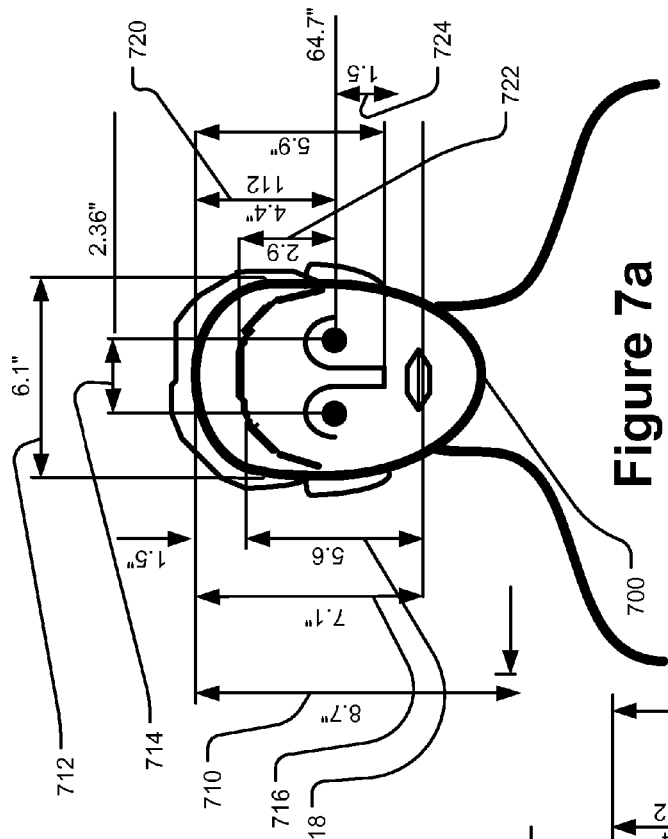
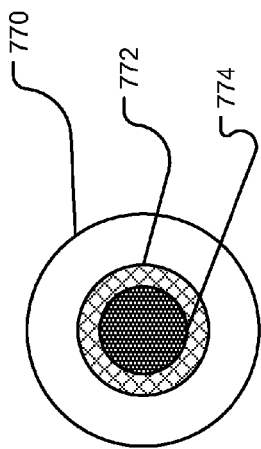
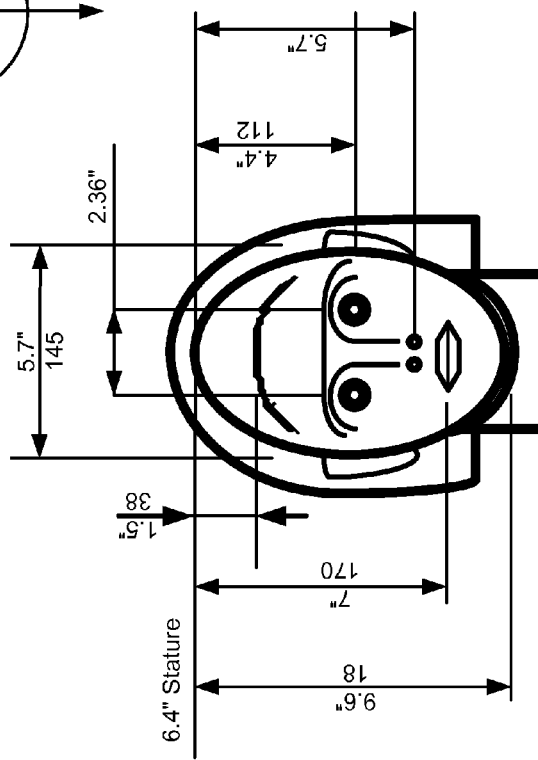
Figure 7a
Figure 7b
Figure 7c

DETECTING RED EYE FILTER AND APPARATUS USING META-DATA

PRIORITY AND RELATED PATENTS AND APPLICATIONS

This application is a Continuation of U.S. patent application Ser. No. 12/613,457, filed Nov. 5, 2009; which is a Continuation of U.S. patent application Ser. No. 10/635,862, filed Aug. 5, 2003, now U.S. Pat. No. 7,630,006, which is incorporated by reference.

This application is related to U.S. patent application Ser. No. 10/170,511, filed Jun. 12, 2002, now U.S. Pat. No. 7,042,505; which is a Continuation of U.S. patent application Ser. No. 08/947,603, filed Oct. 9, 1997, now U.S. Pat. No. 6,407,777, which is hereby incorporated by reference.

BACKGROUND OF THE INVENTION

1. Field of the Invention

The present invention relates generally to digital photography using flash, and specifically to filtering "Red Eye" artifacts from digital images shot by digital cameras or scanned by a digital scanner as part of an image acquisition process or an image printing process.

2. Description of the Related Art i. Red Eye Phenomenon

"Red-eye" is a phenomenon in flash photography where a flash is reflected within a subject's eye and appears in a photograph as a red dot where the black pupil of the subject's eye would normally appear. The unnatural glowing red of an eye is due to internal reflections from the vascular membrane behind the retina, which is rich in blood vessels. This objectionable phenomenon is well understood to be caused in part by a small angle between the flash of the camera and the lens of the camera. This angle has decreased with the miniaturization of cameras with integral flash capabilities. Additional contributors include the relative closeness of the subject to the camera, iris color where light eyes are more susceptible to this artifact and low ambient light levels which means the pupils are dilated.

The red-eye phenomenon can be somewhat minimized by causing the iris to reduce the opening of the pupil. This is typically done with a "pre-flash", a flash or illumination of light shortly before a flash photograph is taken or a strong additional light source. This causes the iris to close. Unfortunately, these techniques typically delay the photographic exposure process by 0.5 second or more to allow for the pupil to contract. Such delay may cause the user to move, the subject to turn away, etc. Therefore, these techniques, although somewhat useful in removing the red-eye artifact, can cause new unwanted results.

ii. Digital Cameras and Red Eye Artifacts

Digital cameras are becoming more popular and smaller in size. Digital cameras have several advantages over film cameras, e.g. eliminating the need for film as the image is digitally captured and stored in a memory array for display on a display screen on the camera itself. This allows photographs to be viewed and enjoyed virtually instantaneously as opposed to waiting for film processing. Furthermore, the digitally captured image may be downloaded to another display device such as a personal computer or color printer for further enhanced viewing. Digital cameras include microprocessors for image processing and compression and camera systems control. Nevertheless, without a pre-flash, both digital and film cameras can capture the red-eye phenomenon as the flash reflects within a subject's eye. Thus, what is desired is a method of eliminating red-eye phenomenon within a miniature digital camera having a flash without the distraction of a pre-flash.

An advantage of digital capture devices is that the image contains more data than the traditional film based image has. Such data is also referred to as meta-data and is usually saved in the header of the digital file. The meta-data may include information about the camera, the user, and the acquisition parameters.

iii. Digital Scanning and Red Eye Artifacts

In many cases images that originate from analog devices like film are being scanned to create a digital image. The scanning can be either for the purpose of digitization of film based images into digital form, or as an intermediate step as part of the printing of film based images on a digital system. Red Eye phenomenon is a well known problem even for film cameras, and in particular point and shoot cameras where the proximity of the flash and the lens is accentuated. When an image is scanned from film, the scanner may have the option to adjust its scanning parameters in order to accommodate for exposure and color balance. In addition, for negative film, the scanner software will reverse the colors as well as remove the orange, film base mask of the negative.

The so-called meta data for film images is generally more limited than for digital cameras. However, most films include information about the manufacturer, the film type and even the batch number of the emulsion. Such information can be useful in evaluating the raw, uncorrected color of eyes suffering from red eye artifacts.

iv. Red-Eye Detection and Correction Algorithms

Red-eye detection algorithms typically include detecting the pupil and detecting the eye. Both of these operations may be performed in order to determine if red-eye data is red-eye or if an eye has red-eye artifact in it. The success of a red eye detection algorithm is generally dependent on the success of a correct positive detection and a minimal false detection of the two. The detection is primarily done on image data information, also referred to as pixel-data. However, there is quite a lot of a-priori information when the image is captured and the nature of the artifact that can be utilized. Such information relies on both anthropometric information as well as photographic data.

v. Anthropometry

Anthropometry is defined as the study of human body measurement for use in anthropological classification and comparison. Such data, albeit extremely statistical in nature, can provide good indication as to whether an object is an eye, based on analysis of other detected human objects in the image.

vi. Bayesian Statistics

A key feature of Bayesian methods is the notion of using an empirically derived probability distribution for a population parameter such as anthropometry. In other words, Bayesian probability takes account of the system's propensity to misidentify the eyes, which is referred to as 'false positives'. The Bayesian approach permits the use of objective data or subjective opinion in specifying an a priori distribution. With the Bayesian approach, different individuals or applications might specify different prior distributions, and also the system can improve or have a self-learning mode to change the subjective distribution. In this context, Bayes' theorem provides a mechanism for combining an a priori probability distribution for the states of nature with new sample information, the combined data giving a revised probability distribution about the states of nature, which can then be used as an a priori probability with a future new sample, and so on. The intent is that the earlier probabilities are then used to make ever better decisions. Thus, this is an iterative or learning process, and is a common basis for establishing computer programs that learn from experience.

Mathematically,

While conditional probability is defined as:

$$P(A|B) = \frac{P(A \cap B)}{P(B)}$$

In Bayesian statistics:

$$P(A|B) = \frac{P(B|A)P(B)}{P(A)}$$

Alternatively a verbal way of representing it is:

$$Posterior = \frac{Likelihood \times Prior}{Normalizing\_Factor}$$

Or with a Likelihood function L( ), over a selection of events, which is also referred to as the Law of Total Probability:

$$P(B_i|A) = \frac{L(A|B_i)P(B)}{\sum_{all-j} L(A|B_j)P(B_j)}$$

A Venn diagram is depicted in FIG. 8-b.

SUMMARY OF THE INVENTION

A method of filtering a red-eye phenomenon from an acquired digital image including a multiplicity of pixels indicative of color, the pixels forming various shapes of the image, is provided. The method includes analyzing meta-data information including information describing conditions under which the image was acquired and/or acquisition device-specific information; determining one or more regions within said digital image suspected as including red eye artifact; and determining, based at least in part on said meta-data analysis, whether said regions are actual red eye artifact.

The method may further include obtaining anthropometrical information of human faces and the determining, based at least in part on said meta-data analysis, whether the regions are actual red eye artifact, being based further on the anthropometrical information.

The filtering may be executed within a portable image acquisition device, having no photographic film. The filtering may be executed as a post-processing step on an external computation device.

The meta-data information describing the conditions under which the image was acquired may include an indication of whether a flash was used when the image was acquired and/or an aperture at the time of the acquisition. The acquisition device information may include sensor size and/or a spectral response of a sensor of the acquisition device. The acquisition device information may further or alternatively include a color transformation from raw sensor pixel values to saved image pixel values. A color of the pixels indicative of red eye color may be calculated based on a spectral response and a color transformation.

A lens may be used to capture the image. The meta-data information may include a focal length of the lens and/or a focusing distance of the lens at time of acquisition.

The actual red eye artifact may be determined based on calculated expected size of the red eye artifact based on the meta-data information including the acquisition device information. The calculated expected size of the red eye artifact may be defined as a range with a density probability function. The range may be determined by depth of field which is a function of said aperture setting. The method may further include obtaining anthropometrical information of human faces and the determining, based at least in part on the meta-data analysis, whether the regions are actual red eye artifact, may be based further on the anthropometrical information. The range may be determined by a statistical distribution of the anthropometrical information.

The determining whether the regions are actual red eye artifact may be performed as a probability determination process based upon multiple criteria. The method may further include adjusting a pixel color within any of the regions wherein red eye artifact is determined and outputting an adjusted image to a printer. The pixel color correcting may also be performed within the printer. The method may further include adjusting a pixel color within any of the regions wherein red eye artifact is determined and outputting an adjusted image.

A digital apparatus having no photographic film is also provided. The apparatus includes a source of light for providing illumination during image capturing; a digital image capturing apparatus; at least one of an image display and an image output; and a red-eye filter for modifying pixels indicative of a red-eye phenomenon within the at least one of the image display and the image output.

The apparatus may further include memory for recording the image after applying the filter module for modifying pixels as a modified image. The modified pixels may be stored directly in the image by replacing the pixels within the image indicative of red-eye phenomenon to create the modified image. The modified pixels may be stored as an overlay of the image thus preserving the original image. The modified pixels may be processed by an external device. The external device may be a personal computer and/or a printer.

The apparatus may further include an image output for downloading an integral image display for printing the image modified by the red-eye filter. The red-eye correction module may generate an overlay for the pixels indicative of the red-eye phenomenon of the captured image for the at least one of image display and image output.

The pixels indicative of the red-eye phenomenon may have a color and shape indicative of the red-eye phenomenon and the image may be modified to change the color to a black color. Also, the source of light may selectively provide illumination during image capturing, and the red-eye filter may be enabled to modify the image in response to the source of light providing illumination during image capturing. The apparatus may include an exposure control means for determining if the image was captured in a condition conducive to the red-eye phenomenon and for generating a red-eye signal in response thereto. The red-eye filter may be further enabled in response to the red-eye signal.

The red-eye filter may further include a false-detection avoidance apparatus which enables modification of the pixels indicative of the red-eye phenomenon in response to an absence of color indicative of the red-eye phenomenon with in a vicinity of and exclusive to the pixels. The red-eye filter may further include a false-detection avoidance apparatus which enables modification of the pixels in response to one or more of a substantially white colored region, an iris ring and an eyebrow line within a vicinity of the pixels. The red-eye filter may detect the pixels within the image indicative of a red-eye phenomenon based on one or more of a substantially white colored region, an iris ring and an eyebrow line within a vicinity of the area.

The red-eye filter may include a pixel locator for locating the pixels having a color indicative of the red-eye phenomenon; a shape analyzer for determining if a grouping of at least a portion of the pixels located by the pixel locator include a shape indicative of the red-eye phenomenon; and a pixel modifier for modifying the color of the pixels within the grouping. The false-detection analyzer may further process the image in a vicinity of the grouping for details indicative of an eye, and for enabling the pixel modifier in response thereto. The apparatus may further include an exposure analyzer for determining if the image was recorded in a condition indicative of the red-eye phenomenon. The red-eye filter may further include an exposure analyzer for determining if the image was recorded in a condition indicative of the red-eye phenomenon.

The exposure analyzer may determine if the image was recorded in a condition indicative of the red-eye phenomenon including determining whether the light source was used during image recording. The exposure analyzer may determine if the image was recorded in a condition indicative of the red-eye phenomenon including determining whether low ambient lighting conditions existed during image recording. The exposure analyzer may determine if the image was recorded in a condition indicative of the red-eye phenomenon. The exposure analyzer may further include a distance analyzer for determining if the subject was at a relatively close distance to the apparatus during image recording.

A portable digital image acquisition apparatus having no photographic film is also provided. The apparatus includes an integral flash for providing illumination during image recording; a digital image capturing apparatus for recording an image; and a red-eye filter for modifying an area within the image indicative of a red-eye phenomenon.

The apparatus may further include an integral image display for displaying the modified image. The area may have a color and shape indicative of the red-eye phenomenon and the image may be modified to change the color to a black color. The integral flash may selectively provide illumination during image recording, and the red-eye filter may be enabled to modify the image in response to the integral flash providing illumination during image recording.

The apparatus may include an exposure control means for determining if the image was recorded in a condition conducive to the red-eye phenomenon and for generating a red-eye signal in response thereto. The red-eye filter may be further enabled in response to the red-eye signal.

The red-eye filter may further include a falsing avoidance apparatus which enables modification of the area in response to an absence of color indicative of the red-eye phenomenon within a vicinity of and exclusive to the area. The red-eye filter may further include a falsing avoidance apparatus which enables modification of the area in response to a substantially white colored region within a vicinity of the area.

The red-eye filter may include a pixel locator for locating pixels having a color indicative of the red-eye phenomenon; a shape analyzer for determining if a grouping of at least a portion of the pixels located by the pixel locator comprise a shape indicative of the red-eye phenomenon; and a pixel modifier for modifying the color of the pixels within the grouping. The red-eye filter may further include a falsing analyzer for further processing the image in a vicinity of the grouping for details indicative of an eye, and for enabling the pixel modifier in response thereto. The red-eye filter may further include an exposure analyzer for determining if the image was recorded in a condition indicative of the red-eye phenomenon.

A method of filtering a red-eye phenomenon from an acquired digital image comprising a multiplicity of pixels indicative of color, the pixels forming various shapes of the image, is further provided. The method includes analyzing meta-data information including information describing conditions under which the image was acquired, digitized and/or captured; determining one or more regions within the digital image suspected as including red eye artifact; and determining, based at least in part on the meta-data analysis, whether the regions are actual red eye artifact.

The method may further include obtaining anthropometrical information of human faces and the determining, based at least in part on said meta-data analysis, whether the regions are actual red eye artifact, may be based further on the anthropometrical information. The filtering method may be executed within a portable image acquisition device, having no photographic film. The filtering method may be executed as a post-processing step on an external computation device. The meta-data information describing the conditions under which the image was acquired may include an indication of whether a flash was used when the image was acquired. The determining whether the regions are actual red eye artifact may be performed as a probability determination process based upon multiple criteria. The method may include adjusting a pixel color within any of the regions wherein red eye artifact is determined and outputting an adjusted image to a printer. The pixel color correction may also be performed within the printer.

BRIEF DESCRIPTION OF THE DRAWINGS

FIGS. 3a-3d schematically depicts a light sensor, and the formation of a digital pixelated image on it, in accordance with a preferred embodiment.

FIG. 5 illustrates by means of geometric optics, a relationship between an object and an image based on a distance to the object and the focal length, where the focal length is the distance from the image principal plane of the optical system to the image focal plane, which is the plane where the image of the object situated at infinity is formed.

FIG. 6 illustrates a relationship between focal length of a lens and depth of field, and an object size as it appears on an image.

FIGS. 7a-7c illustrate some anthropometric measurements of a human face for an adult male and female.

INCORPORATION BY REFERENCE

Figure 1:
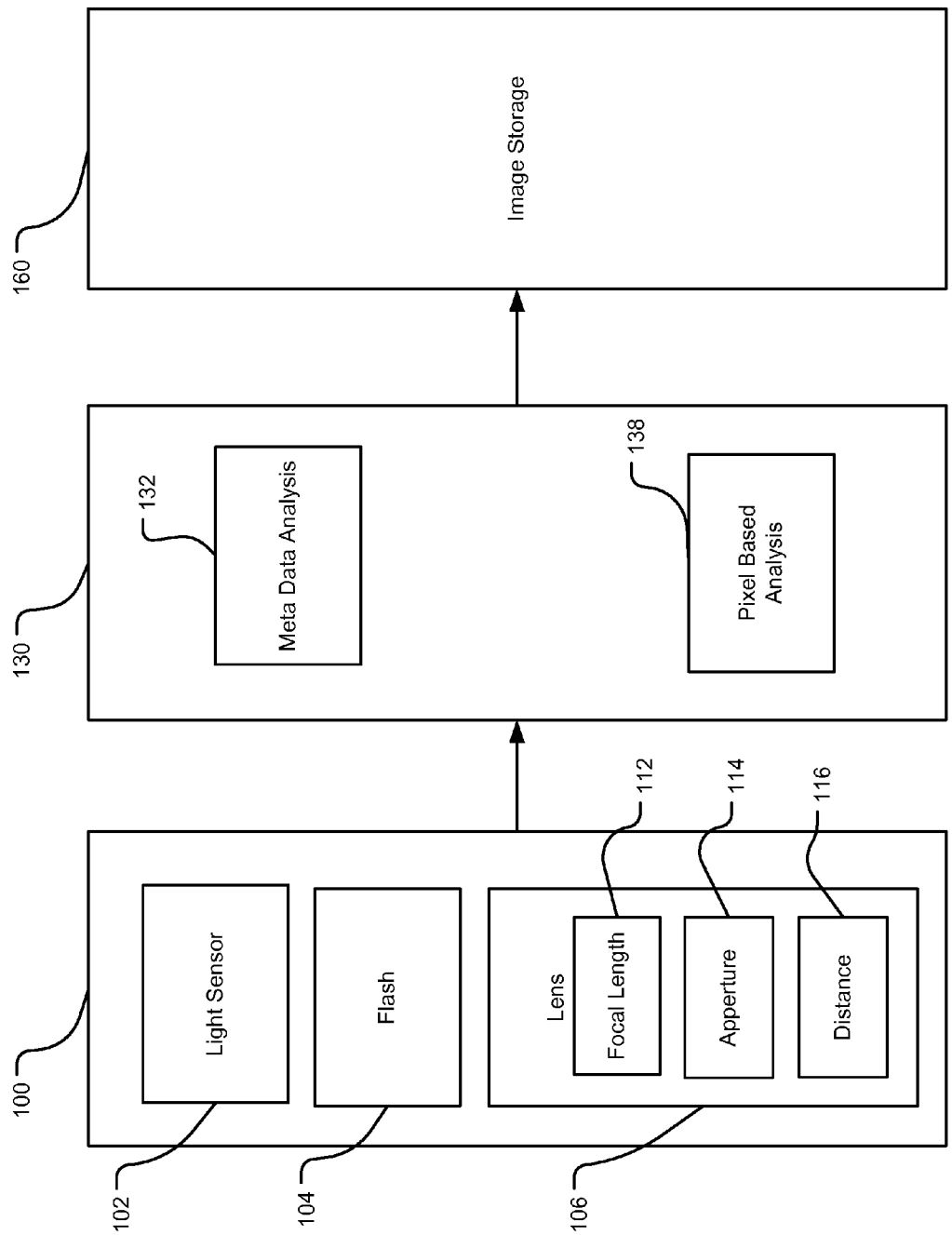
FIG. 1 shows a block diagram of an acquisition device operating in accordance with a preferred embodiment.

What follows is a cite list of references which are, in addition to those references cited above and below herein, and including that which is described as background, the invention summary, brief description of the drawings, the drawings and the abstract, hereby incorporated by reference into the detailed description of the preferred embodiments below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the preferred embodiment with the same effect as just described with respect to the following references:

U.S. Pat. Nos. 4,285,588, 5,016,107, 5,070,355, 5,202,720, 5,537,516, 5,452,048, 5,748,764, 5,761,550, 5,781,650, 5,862,217, 5,862,218, 5,991,549, 6,006,039, 6,433,818, 6,510,520, 6,516,154, 6,505,003, 6,501,911, 6,496,655, 6,429,924, 6,252,976, 6,278,491;

United States published applications no. 2003/0058349, 2003/0044177, 2003/0044178, 2003/0044070, 2003/0044063, 2003/0025811, 2002/0150306, 2002/0041329, 2002/0141661, and 2002/0159630;

PCT published applications no. WO 03/026278, WO 99/17254; and WO 01/71421; and

Japanese patents no. JP 04-192681, JP 2000/134486, and JP 2002/271808; and

European patents no. EP 0 884 694 A1, EP 0 911 759 A2,3, EP 1 293 933 A1, EP 1 199 672 A2, EP 1 288 858 A1, EP 1 288 859 A1, and EP 1 288 860 A1; and Matthew Gaubatz, et al., "Automatic Red-eye Detection and correction", IEEE ICIP, 2002, pp. I-804-I-807.

DETAILED DESCRIPTION OF THE PREFERRED EMBODIMENTS

Preferred embodiments described below include methods for detecting red eye artifacts in digital images. Methods are also described for utilizing meta-data gathered as part of the image acquisition to remove such red-eye artifacts. In addition, methods for enhancing the accuracy of detection of red eye artifacts based on a-priori knowledge of the camera sensor, the acquisition mechanism and the color transformation are described. Methods are described for enhancing the speed of detection of red eye artifacts in digital images, and for reducing the amount of false detection of regions suspected to be red-eye artifacts. A method for user-selected tradeoff between the reduction of false detection and the improvement of positive detection is also described. In addition, a way to estimate the size of faces is provided, and in particular the eyes in an image and in particular the size of eyes in faces based on the acquisition data. A way to improve the detection of the eyes based on anthropometric analysis of the image is also provided. An improvement is described for the detection of the eyes based on a Bayesian statistical approach. An improvement is also described for the detection of the red eye artifacts based a priori knowledge of the film manufacturer, the film type and/or the emulsion batch of the film. An improvement is also described for the detection of the eye artifact based on a priori knowledge of the scanner its light source and the color sensors of the scanner.

In one embodiment, a digital camera has a built in flash, an image acquisition mechanism and a way to save the acquired data. The methods of the preferred embodiments are generally applicable to digital image acquisition devices, such as digital cameras and scanners, and to and output devices such as printers and electronic storage devices. When the terms digital camera and output device or printer are used, it is generally meant to more broadly, respectively include digital image acquisition devices and digital data output devices.

A printer that receives image data from an original image acquisition device such as a digital camera or scanner may include a display that shows the image, or may be configurable to be cable, rf, or otherwise connected to a display. In this way, the image may be previewed before printing, and if desired, corrected and previewed again until the image is as desired for printing. Another alternative is to permit the image to be printed as a thumbnail with a preview of the red eye corrected regions to save on printing time and money. These regions of interest as to red eye correction may be circled or otherwise indicated in the printer viewer and or in the printed thumbnail. In a case where the camera itself includes the red eye correction software, firmware, and/or memory or other electronic component circuitry, then such preview and/or thumbnail capability may be included within the camera that may itself be cable, rf, network and/or otherwise connected to the printer.

The digital camera or other acquisition device preferably has the capability of analyzing and processing images. Alternatively, the processing of the images can be done outside of the camera on a general purpose or specialized computer after downloading the images or on a device that is acting as a hosting platform for the digital camera. Such a device may be, but is not limited to, a hand held PC, a print server, a printer with built in processing capability, or cell phone equipped with a digital camera. Alternatively the acquisition process can be of an analog image, such as scanning of a film based negative or reversal film, or scanning of a photographic print.

The accuracy of a detection process may be measured by two parameters. The former is the correct detection, which relates to the percentage of objects correctly detected. The second parameter for evaluating successful detection is the amount of mis-classifications, which is also defined as false detections or beta-error. False detections relate to the objects falsely determined to have the specific characteristics, which they do not possess.

Overall, the goal of a successful detection process is to improve the accuracy of correct detections while minimizing the percentage of false detections. In many cases there is a tradeoff between the two. When the search criterion is relaxed, more images are detected but at the same time, more false detections are typically introduced, and vice versa.

In order to improve the accuracy of the red eye detection and correction, a preferred embodiment utilizes a priori information about the camera or camera-specific information, anthropometric information about the subject, and information gathered as part of the acquisition process. That is, although information gathered as part of the acquisition process may relate to the camera or other digital acquisition device used, information relating to those parameters that are adjustable or that may change from exposure to exposure, based on user input or otherwise, are generally included herein as information relating to the acquisition process. A priori or camera-specific information is camera-dependent rather than exposure-dependent. For example, a-priori information about the camera may include any of the color sensitivity, spectral response or size of the camera sensor, whether the sensor is CCD or CMOS, and color transformations from the RAW data gathered by the sensor, e.g., CCD, to a known color space such as RGB, the f-stop, or other camera-specific parameters understood by those skilled in the art, or combinations thereof. In the case of scanning such a-priori information may include the color sensitivity curve of the film, the color sensitivity of the scanner sensor, whether CCD or CMOS, whether linear or area sensors, the color transformations from the RAW data gathered by the scanner to a known color space such as RGB. Acquisition data may include any of the focal distance as determined by the auto focus mechanism of the digital camera, the power of the flash including whether a flash was used at all, the focal length of the lens at acquisition time, the size of the CCD, the depth of field or the lens aperture, exposure duration, or other acquisition parameters understood by those skilled in the art, or combinations thereof. Anthropometric data may include first and higher order statistics, which is an average and a variability of an expected size and ratio between different parts of the human body, and particularly the facial region.

Based on utilizing the aforementioned information, preferred embodiments described herein achieve a more accurate detection of the regions containing red eye artifacts. Based on this detection, the processor, whether in the camera or on a different device, can perform a correction step.

FIG. 1 is a components diagram in accordance with a preferred embodiment. Block 100 describes the image acquisition device which can be a digital camera in different packaging such as a digital still camera, a lens connected to a hand held computer, a cell phone with image capturing capability, a video camera with still image capturing capability, etc.

In the image capture apparatus 100, there are a few components shown in block form in FIG. 1. The first is the light sensor 102 that can be a CCD, CMOS or any other object that transforms light information into electronic encoding. Most cameras are equipped with a built in flash 104, also referred to as a strobe. In many cases, the camera strobe is physically close to the lens, which tends to accentuate the occurrence and strength of the red eye artifact. In addition, the camera is equipped with a lens 106. The relevant parameters of the lens during acquisition include the aperture 114, or a f-stop, which primarily determines the depth of field, the focal length 112 which determines the enlargement of the image, and the focusing distance 116 which determines the distance to the objects that the lens 106 was focused at.

Block 130 of FIG. 1 describes the red eye filter that performs a process of detection and correction of the red eye artifacts in accordance with a preferred embodiment. The process can be done in the camera as part of the acquisition stage, in the camera at a post processing stage, during the transferring of the images from the camera to an external device such as a personal computer, or on the external device as a post processing stage, such as in the image transfer software or image editing software.

The red eye filter includes two main stages. Block 132 describes a meta-data analysis module 132, where the image and the probability for red eye artifacts are evaluated based on the acquisition data and/or other meta-data. Block 138 describes the pixel-based analysis where the image data is used. The pixel-based analysis 138 preferably receives information from the meta-data stage 132. Therefore, the decision on the pixel level may vary based on the conditions under which the image was captured and/or other meta-data. Block 160 describes the image storage component 160 that saves the image after the red eye correction operation.

Figure 2:
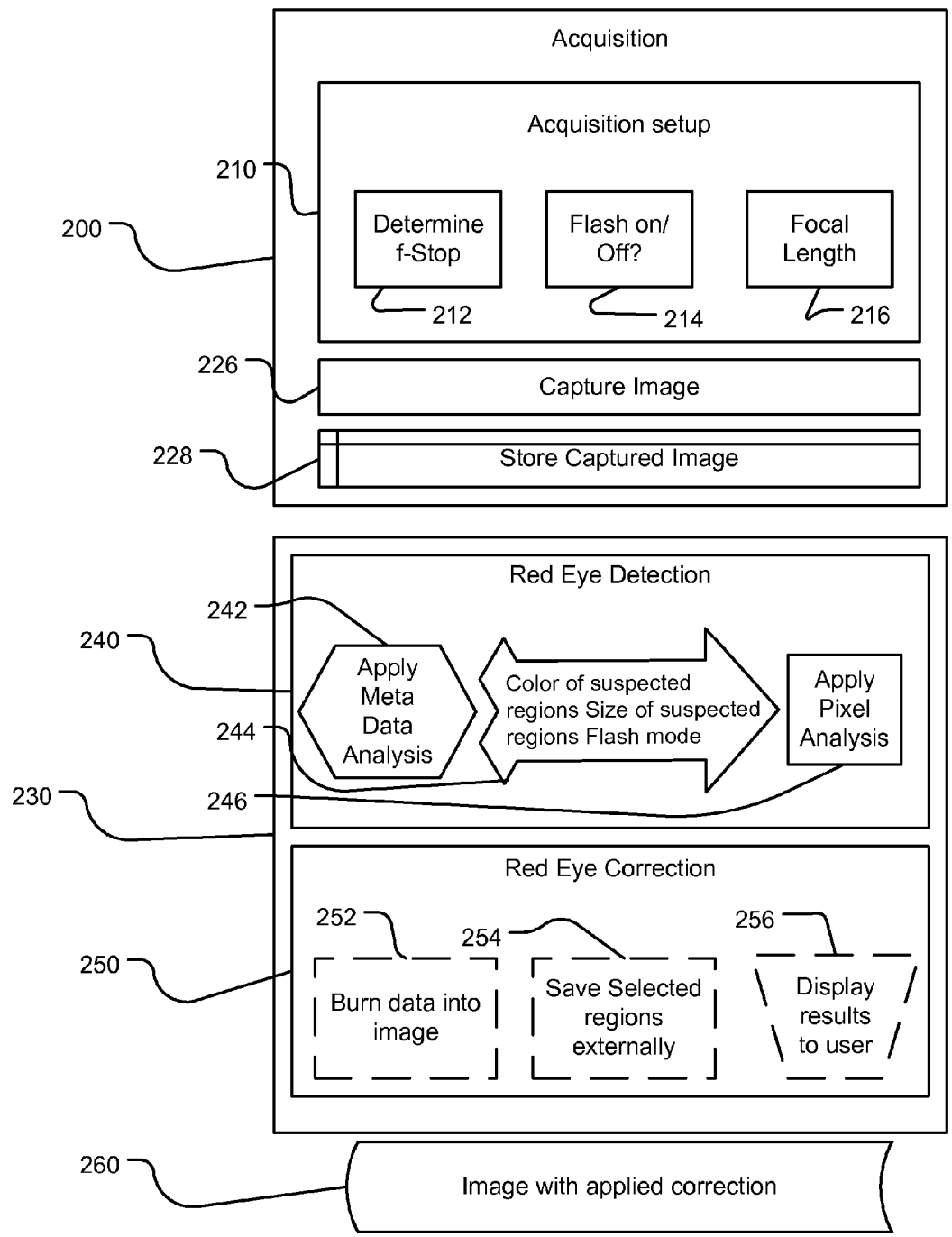
FIG. 2 illustrates a high level workflow of detecting red eye artifacts in digital images in accordance with a preferred embodiment.

FIG. 2 is a workflow representation corresponding to the preferred camera embodiment illustrated at FIG. 1. The image capture stage is described in block 200. This operation includes the pre-acquisition setup 210, where the user and/or the camera determine preferred settings such as f-stop 212, flash on/off 214 and/or focal length 216. The image capture stage 200 also includes acquisition or picture taking 226, and temporary storage in block 228 in its final form or in a raw form that corresponds to the image as captured by the light sensor 102 of FIG. 1. As part of the capture process, the camera determines the best acquisition parameters in the pre-acquisition stage 210. Such parameters may include the right exposure, including gain, white balance and color transformation, and in particular aperture settings 212 and whether to use flash 214. In addition, the user may decide on the focal length 216 of the lens 106, which is also be referred to as the zoom position.

The image after being stored in block 228, is then processed for red eye 230 in accordance with a preferred embodiment, among other stages of processing that may include color corrections, compression, sharpening, etc. The red eye filter preferably includes two main operations. The red eye detection 240 and red eye correction 250.

The red eye detection 240 includes a first stage of analyzing the peripheral or external data, or meta-data 242, a stage of transferring the revised data 244, and the specific red eye detection 246, based on pixel analysis.

The red eye correction is illustrated at FIG. 2 as the operation 250 where any image modifications based on the results of the detection stage 240, are applied to the image. At this stage 250, correction may be burned into the data 252, thus replacing the damaged pixels, saved as a list of the pixels that need to be changed with their new value in the header of the image or externally 254, and/or presented to the user 256, requesting the user to take an action in order to apply the corrections, or a combination of these operations. The image, with the corrections applied as described in 240, is then preferably saved in block 260.

FIGS. 3a-3d illustrates in detail the image as created on the receptor 102 of FIG. 1, which is located at the image plane of the optical system. Such receptor can be any electro-photo-sensitive object such as CCD or CMOS.

FIG. 3a illustrates a grid type CCD. Each one of the smaller squares (as illustrated by block 302) is a cell, which is sensitive to light. The CCD size 304 is calculated as the diagonal of the rectangle made of Width 306 and Height 308.

FIG. 3b illustrates how a face may be projected onto the CCD. FIG. 3c illustrates how the image is pixelized, where the continuous image is transformed into a grid based image.

FIG. 3d is more specific to the image as created by a human eye. The image of the eye will include the iris 342 as well as the pupil 344, which is usually the locations where red-eye artifacts occur. The white part 346 of the eye is also a component of the human eye illustrated at FIG. 3d and which can be used in red-eye detection, particularly false-detection avoidance.

Figure 4:
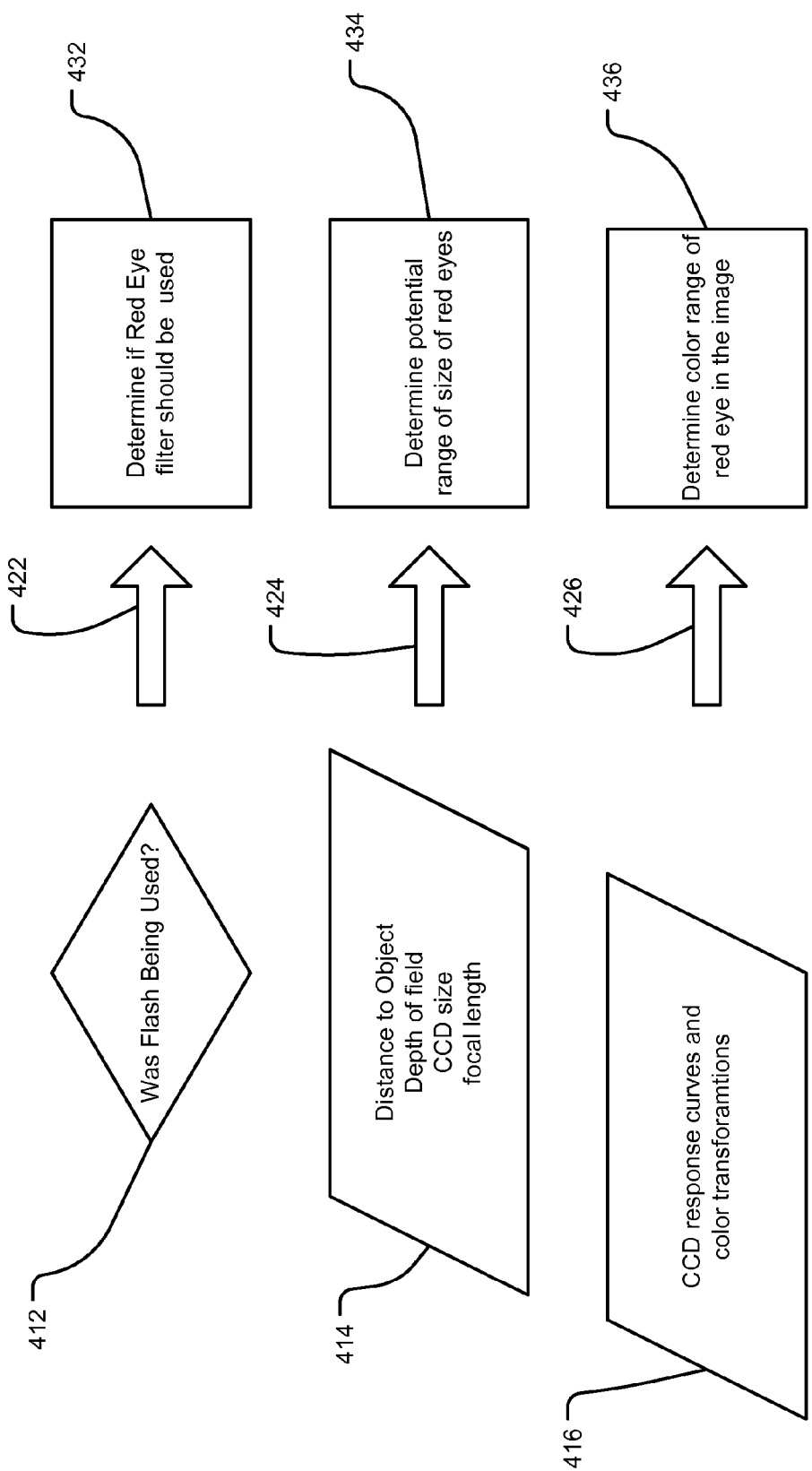
FIG. 4 describes a process of collecting, forwarding and analyzing meta-data as part of red-eye detection in accordance with a preferred embodiment.

FIG. 4 illustrates various meta-data information that can be utilized as part of a preferred embodiment as a priori input, and the potential outcome of such data analysis. For example, blocks 412, 422, and 432 illustrate an operation of red-eye detection relating to the use or non-use of flash. The information whether the flash is used or not, Block 412, is forwarded at operation 422 to red-eye pre-processing 432 to determine whether there is reason to launch the red-eye filter. If a Flash, as determined in 412 is not used, there is preferably no reason to apply the redeye filter. This is a reasonable estimation for consumer lever cameras where most of the red eye is created, as described in the introduction, by the small disparity between the strobe unit and the lens.

Blocks 414, 424, 434 describe a collection of acquisition meta-data, wherein non-exhaustive examples are provided including the distance to the object, the aperture, CCD size, focal length of the lens and the depth of field. This data is usually recorded on or with the image at acquisition. Based on this information, as transferred to the filter at operation 424, the filter can determine at operation 434, e.g., a range of potential sizes of red eye regions.

Figure 9:
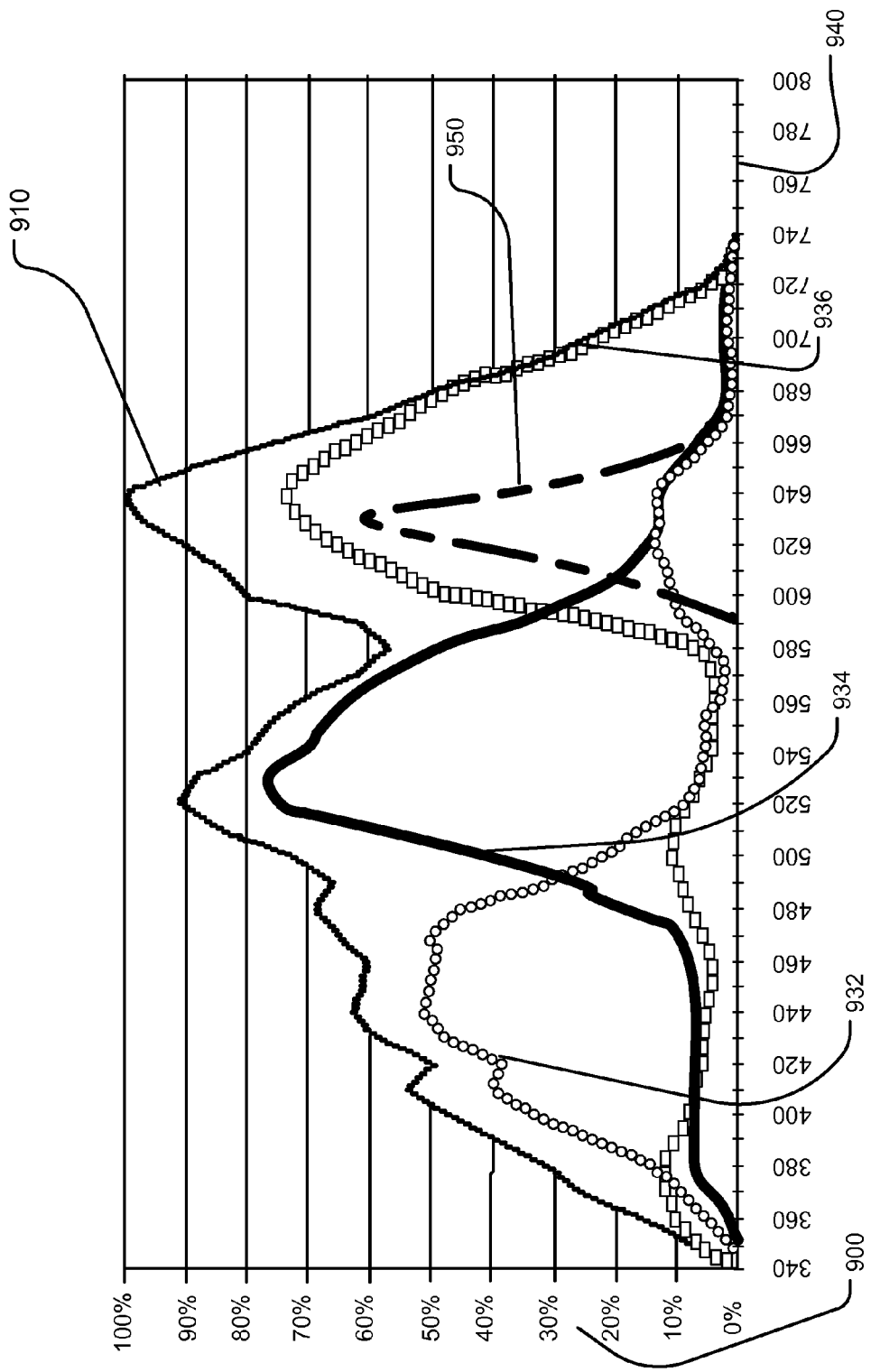
FIG. 9 depicts a spectral response of an acquisition system based on spectral sensitivity curves of a hypothetical three color sensor, the spectral distribution of a generic light source and the spectral characteristics of a object being photographed, in accordance with a preferred embodiment.

Blocks 416, 426, 436 relate to specific information that is unique to the camera. The color composition, e.g., of the image is determined by a few parameters which include the CCD response curves as illustrated in FIG. 9 (see below), and the potential color transformations from the recorded, raw image data such as color correction, gain adjustment and white balance to a known color space such as RGB or YCC. Such transformations can be presented in the form of lookup tables, transformation matrices, color profiles, etc.

Based on the knowledge of the transfer from operation 426, the software can better determine a more precise range of colors at operation 436 that are good candidates for the red eye artifacts. This information can advantageously narrow down the potential red eye regions based on the variability of sensors and color correction algorithms. It may also help to eliminate colors that, without this knowledge, could be falsely identified as potential red eye region candidates, but are not such in case of a specific combination of sensor and color transformation.

FIG. 5 depicts illustrative information that can be gathered to determine the relative size of the object. The ratio of the image size divided by image distance, and the object size divided by the object distance, are approximately equal, wherein the image size divided by the object size is defined as the magnification of the lens 106. If one knows three out of the four values, namely focal length 112, distance to object 116, and object size 516, one can estimate the size of the object:

$$\frac{\text{Object size (516)}}{\text{distance to object (116)}} = \frac{\text{image size (512)}}{\text{focal length (112)}}$$

If one knows three out of the four values, namely focal length 112, distance to object 116, and object size 516 one can estimate the image size 512:

$$\text{Object size (516)} = \frac{\text{distance to object (116)} \cdot \text{image size (512)}}{\text{focal length (112)}}$$

Figure 8A:
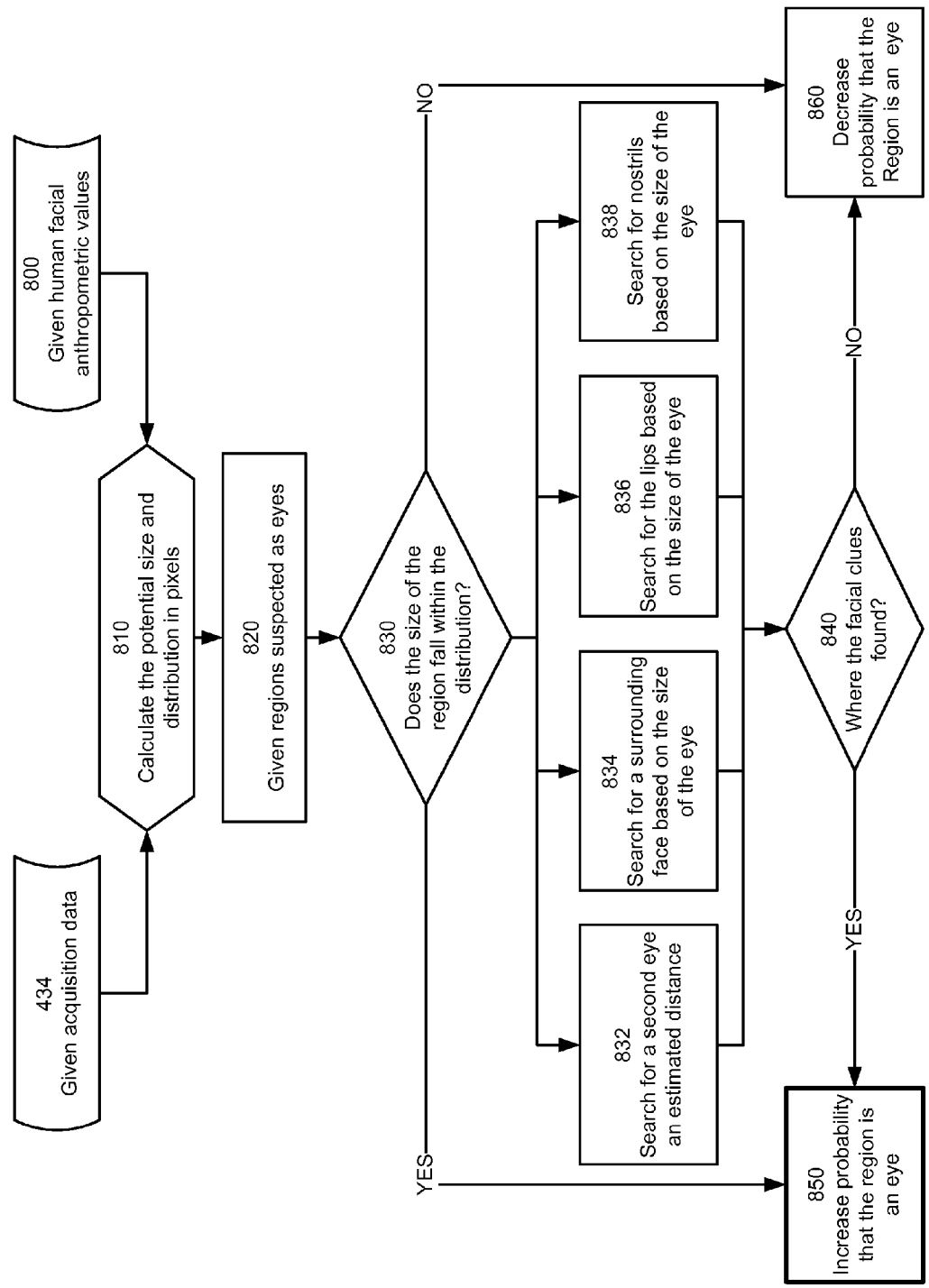
FIGS. 8a-8b show a workflow diagram describing a statistical analysis of an image using anthropometric data in accordance with a preferred embodiment.

However, the parameter values described above are usually not known precisely. Instead, distributions of values can be estimated based on different reasons as depicted in FIGS. 6, 7 and 8.

FIG. 6, illustrates the variability generated by the depth of field. Depth of field is defined as the range of distances from the camera to the objects where the images of the objects are captured sufficiently sharp. For a fixed length lens, the depth of field is a function of the aperture. The more open the aperture is, the shallower the depth of field is.

As can be seen in FIG. 6, due to the fact that the depth of field can be rather large, the distance to the objects still in focus can vary. Therefore the parameter Distance_to_Subject is rather a range:

Distance_to_Subject$_{Close\_range}$ ≤ Subject ≤ Distance_to_Subject$_{Far\_range}$ The reason why this information is important and has to be taken into consideration is depicted in FIG. 6. In this case, two objects, a tree 614 and a house 624 are located in close distance 616, and further away 626 respectively. Even though the tree, 614 and the house 634 are the same size, the sizes of the objects or the projections of the objects on the image plane are different and the tree image, 636 being closer to the camera appears much larger than the house 646.

FIG. 7 includes some relevant anthropometrical values for male and female averages. FIG. 7-*a* is an average male and FIG. 7-*b* is an average adult female. For example, for adult male, 700, the distance between the eyes, 714, is on average 2.36", the distance between the eyes and the nostrils, 724, is 1.5" the width of the head, 712 is 6.1" etc.

However, this is only the first order approximation. There is a second order approximation, which is the overall variability of the values. Such variability once again needs to be calculated into the formula.

Or:

Subject_Size$_{Small}$ ≤ Subject_Size ≤ Subject_Size$_{Large}$

The object size, in order to be considered as a candidate for being a face, and eye or any known object will be:

$$\frac{\text{Subject\_SizeSmall} * \text{Focal\_Length}}{\text{Distance\_To\_Object}_{For\_Range}} \le$$

$$\text{Object\_Size} \le \frac{\text{Subject\_Size}_{large} * \text{Focal\_Length}}{\text{Distance\_To\_Object}_{Close\_Range}}$$

Specifically, as seen in FIG. 7-*c*, the average size of an eyeball, 770, is roughly 1", or 24 mm, and the average size of the iris, 772, is half in diameter to the full eye, or 0.5" or 12 mm in diameter. The pupil, 774 can be as small as a few millimeters, and dilated to as large as the size of the iris. Fortunately, in the case of red-eye artifacts, which happen primarily in low lighting conditions that required a flash, the pupil will be on the dilated side.

The variability in this case is not only for different individuals, but also variability based on age. Luckily, in the case of eyes, the size of the eye is relatively constant as the person grows from a baby into an adult, this is the reason of the striking effect of "big eyes" that is seen in babies and young children. The average infant's eyeball measures approximately 19½ millimeters from front to back, and as described above, grows to 24 millimeters on average during the person's lifetime. Based on this data, in case of eye detection, the size of the object which is the pupil which is part of the iris, is limited, when allowing some variability to be:

9 mm ≤ Size_Of_Iris ≤ 13 mm

The object size as calculated above is going to be in actual physical size such as millimeters or inches. For this invention to become useful, this information needs to be presented measured in pixel sizes.

Returning to FIG. 3*a*, the size of the sensor is depicted by 304, which is the diagonal of the sensor. Based on that, and the ratio between the width, 306 and the height, 308, the width and height can be calculated as a Pythagorean triangle.

Sensor_Diagonal_Size = $\sqrt{\text{width}^2 + \text{Height}^2}$

Knowing the sensor resolution, the size of object can now be translated into pixel size.

For example:

Given a ½ inch (12 mm) CCD, with an aspect ratio of 2:3, and a 2,000×3,000 CCD resolution:

The width of the CCD is:

$$12 \text{ mm} = \sqrt{(2\alpha)^2 + (3\alpha)^2} = \sqrt{13}\alpha$$

∴

$$3\alpha = 3 \times 12/\sqrt{13} \approx 3 \times 3.3 \approx 10 \text{ mm}$$

and therefore, for a 3000 pixel width, a 1 mm object size is equal to roughly 300 pixels.

Or $$\text{Image\_Size}_{in\_pixels} = \text{Image\_Size}_{in\_millimeters}$$

Based on this formula, when an image is now detected, its size in pixels is compared to the range allowed, and decided whether the object is a candidate or not.

An example is depicted in FIG. 3d where a hypothetical eye is displayed in pixels, and in this case, the iris 342, is roughly 11 pixels, and the pupil, 344, 6 pixels in diameter. With the added knowledge of the distance to the object and the focal length of the lens, this invention presents a decision process capable of rejecting the objects, 346 that are not eyes and selecting most likely candidates to be an eye based on the sizes of the captured images of the objects.

FIG. 8 describes a preferred workflow to perform, the analysis based on the sizes of objects, and in the case of human beings, the anthropometrical analysis. The input is the acquisition data 434, as described in FIG. 4, and human anthropometric data, 800 as depicted in FIGS. 7a and 7b.

Step 810 describes the calculation of potential size and distribution of the objects, as corresponds to the camera resolution. This process was fully defined above. Note that this calculation can be done on the fly or alternatively pre-calculated values can be stored in a database to speed up the processing.

When looking for eyes in an image, but not limited specifically to eyes, given regions suspected as eyes, 820, a preferred embodiment proposes to check, 830 whether the regions fall within the size and distribution as calculated above in 820. If the size is too large or too small, the system can determine, 890 that the probability for this object to be an eye is low. However, this is a probabilistic result and not necessarily a conclusive one. In other words, the specific region 820 has now low probability assigned to it as a potential eye. If the region is falling inside the allowed size, the probability, 880 are raised.

This preferred embodiment describes additional steps to refine the decision, or increase the probability, by analyzing additional clues such as the existence of a second eye, 832, the surrounding facial features, 834 such as the overall shape of the face, the hair, neck etc., the existence of lips in proximity to the eyes, 836, the nostrils 838 etc.

In each step, the question asked is whether the new feature is part of the region, 840. If the reply is positive, then the probability for identifying the area as an eye is raised, 850, and if negative, the probability is reduced, 860. Of course, this probabilistic approach can be useful to create a better set of criteria in deciding whether the detected object is what the system is looking for. In more detail, the detection process involves two types of allowed errors also known as Type-I and Type-II errors, or also referred to as α-error, which is the acceptable probability of making a wrong decision, or a false positive and β-error, which is the acceptable probability of not detecting at all. Based on this approach, the probability as decreased or increased in steps 850 and 860 are always compared against the two criteria α and β.

Alternatively to the classical statistical approach, this analysis can be done using Bayesian approach. As defined above, Bayesian probability can be calculated based on:

$$P(B_i|A) = \frac{L(A|B_i)P(B)}{\sum_{all-j} L(A|B_j)P(B_j)}$$

Figure 8B:
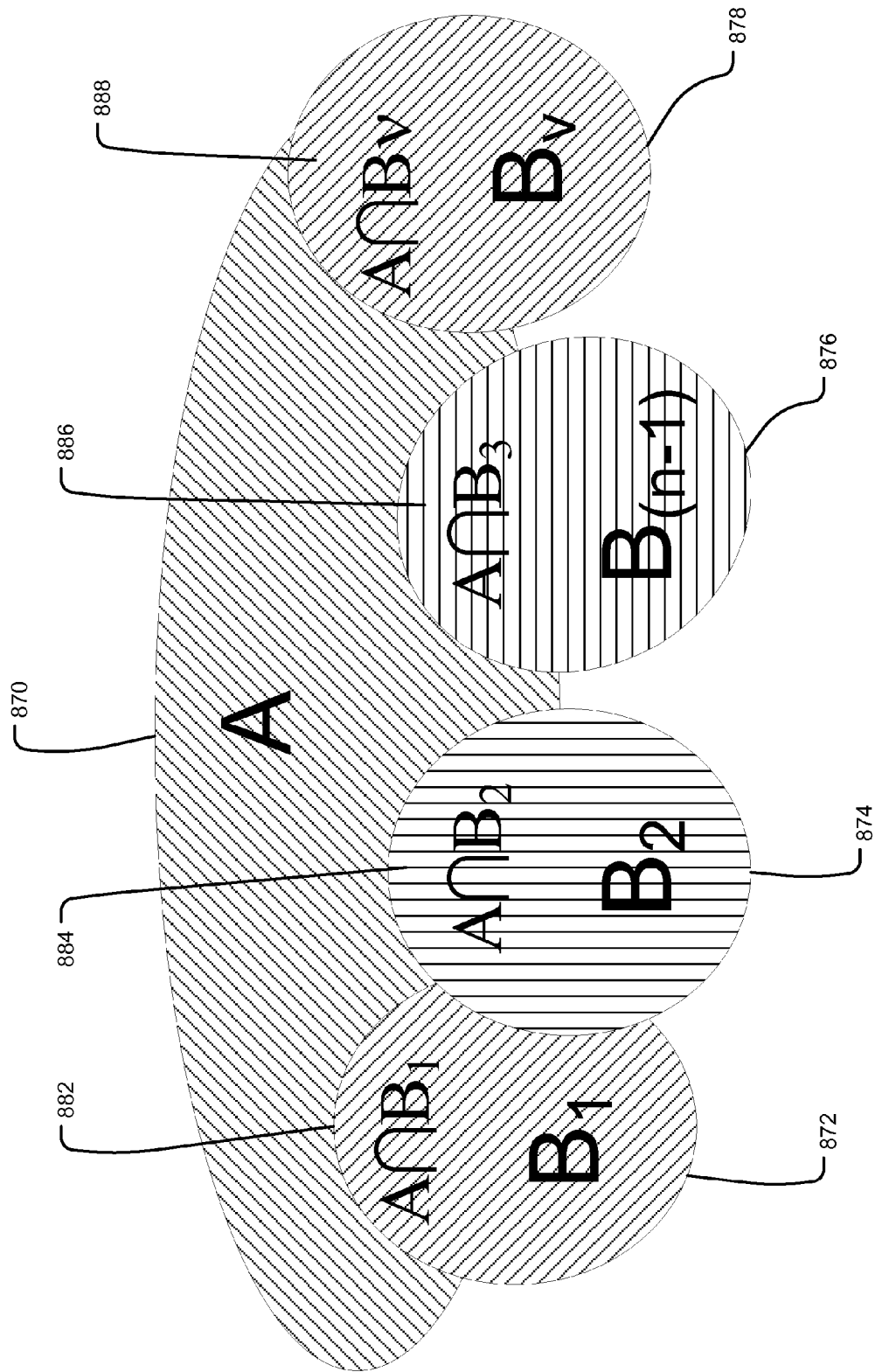

This is further depicted in FIG. 8b. Specifically to this embodiment, the events are:
A=Region detected is red eye, as depicted in Block 870
$B_j$=the various detected features as defined in blocks 872,874, 876 and 878, 834,836 and 838.
$A \cap B_j$=Probability that the area is red eye AND that another attribute is found. For example
If $B_i$ is the probability of detecting lips,
$A \cap B_j$ is the probability that the region is an eye and that the lips are detected.
$P(B_i|A)$ is the probability that lips exist when eye is detected.
And
$P(A|B_i)$ is the probability of eye detection given the probability of lips detection.

FIG. 9 illustrates a different kind of information that can be very useful in determining the existence of red eye artifacts, using the color sensitivity of the capturing system such as a digital camera. Alternatively the capturing system may be analog capture such as film followed by a digitization process such as scanning.

The graph in FIG. 9 describes the relative response, 950 as a function of the visual wavelength 910, of the three sensors for blue, 932, Green 934, and Red 936, of a typical CCD type sensor. Similar graph, although with different response curve describes the response of the different layers for photographic film.

The x-axis, which is the wavelength range of the human visual system, is expanded to include infrared and ultraviolet, which may not be visible to the human eye but may record on a sensor. The y-axis is depicted in relative value as opposed to an absolute one. The three Red, Green, and Blue spectral response functions as functions of the wavelength are defined respectively as:

$$R(\lambda), G(\lambda), B(\lambda)$$

Given a light source 940 defined as a spectral response curve $L(\lambda)$, the light source 940 when reaching the three different color sensors, or color pigments on film will generate a response for each of the colors as defined mathematically as the integral of the scalar multiplication of the curves. The range of integration is from the low wavelength region UV to the highest IR.

$$R = \int_{\lambda-UV}^{\lambda-IR} R_\lambda \times L_\lambda d\lambda,$$

$$G = \int_{\lambda-UV}^{\lambda-IR} G_\lambda \times L_\lambda d\lambda$$

$$B = \int_{\lambda-UV}^{\lambda-IR} B_\lambda \times L_\lambda d\lambda$$

to create a tristimulus value of {R, G, B}

Those skilled in the art are familiar with the fact that different spectral responses may create the same tristimulus values due to the scalar reduction from a 2 dimensional representation to a single value. This effect is also known as Metamerizm which can be a property of the sensor's/film's metamerizm, the human visual system metamerizm, or the light source's metamerizm.

Due to the many variable parameters, it is relatively hard to find a specific color that can be a fixed-reference-point in an image. The reason is that the reflected colors are usually dependent on many factors and especially on the ambient light. However, Red Eye artifacts, as previously explained, are results of the reflection of the strobe light, which has very well defined characteristics, from the vascular membrane behind the retina, which is rich in blood vessels. In most cases, the effect of the external ambient light is relatively low, and the red-eye effect can be considered as a self-illuminating object, with more precise spectral characteristics than other objects. An example of such spectral response, which is a combination, of the flash spectral response, which is relatively broad and the blood vessels inside the eye, is depicted in block 940.

Given the spectral sensitivity of the sensor:

$$R(\lambda), G(\lambda), B(\lambda)$$

and the reflection of the flash light in the eye, as defined by 950, $E(\lambda)$, the red eye tristimulus values for this specific sensor are:

$$\{R, G, B\}_{red-eye} = \int_{\lambda-UV}^{\lambda-IR} \{R, G, B\}_\lambda \times L_\lambda d\lambda$$

This value of $\{R, G, B\}_{red-eye}$ is relatively constant for a given camera. However, due to the difference in the response between different sensors, these values are not constant across different cameras. However, with the knowledge of the response curves above, one can determine a much closer approximation of the range or red colors based on this information. Note that it is not only the value of the Red that may help in such determination, but also the residual response of the red eye on the Green and even less the blue sensor. One skilled in the art knows that most cameras perform additional transformations for exposure and tone reproduction for images before saving them into persistent storage. An example of such transformation will be a concatenation of color correction and tone reproduction as a function of the pixel value:

Given a Raw pixel value of:

$$\{R,G,B\}_{RAW-CCD}$$

as transformed via three lookup tables. For example for red lookup table:

$$R-LUT(Raw-Pix):\{input\_values\} \rightarrow \{output\_values\}$$

For example the Red lookup table R-Lut can be a gamma function from 10 bit raw data to 8 bits as follows:

$$R_{LUT}(Raw-Pix):\{0\ldots 1024\} \rightarrow \{0\ldots 256\}$$

$$R_{LUT}(x) = (R_{RAW-CCD}/1024)^{2.2} * 256$$

and the inverse function $$R^{-1}_{LUT}(x) = (R_{LUT\_RAW}/256)^{1/2.2} * 1024$$

the $\{R,G,B\}$ values after transformed through the lookup table will be:

$$\{R, G, B\}_{LUT\_RAW} =$$

$$\{R_{LUT}(R_{RAW-CCD}), G_{LUT}(G_{RAW-CCD}), B_{LUT}(B_{RAW-CCD})\}$$

$$\{R, G, B\}_{new} = \{R, G, B\}_{LUT\_RAW} \times \begin{bmatrix} RR & RG & RB \\ GR & GG & GW \\ BR & BG & BB \end{bmatrix}$$

With the internal knowledge of these transformations, one can reverse the process, to reach the RAW values as defined above.

$$\{R, G, B\}_{LUT\_RAW} = \begin{bmatrix} RR & RG & RB \\ GR & GG & GW \\ BR & BG & BB \end{bmatrix}^{-1} \times \{R, G, B\}^{TNEW}$$

and $$\{R, G, B\}_{RAW} = \{R^{-1}_{LUT}(R_{LUT\_RAW}), G^{-1}_{LUT}(G_{lut\_raw}), B^{-1}_{LUT}(R_{LUT\_RAW})\}$$

and the value of the raw tristimulus values can be then determined and used for the exact matching. Similar transformations are performed by digital scanners in order to correct for sub optimal images such as underexposure, or wrong ambient light. Reversing the process may be difficult in its pure mathematical sense e.g. the conversion function may through the transformation not be fully reversible. Such issues occur for example when the pixel values are clipped or condensed. In such cases, there is a need to define a numerical approximation to the inverse function.

The preferred embodiments described above may be modified by adding or changing operations, steps and/or components in many ways to produce advantageous alternative embodiments. For example, there are generally two approaches to removing red-eye from images. The traditional one includes an attempt to reduce one or more reasons that cause red eye prior to taking the picture. The second approach is the post processing of the images to detect and then eliminate the red-eye artifact in a post processing stage, as described in accordance with a preferred embodiment.

There are many ways that analysis processes operating within a camera prior to invoking a pre-flash may be configured. Various conditions may be monitored prior to the photograph and even before the pre-flash is generated. These conditions may include the ambient light level and the distance of the subject from the camera (see, e.g., U.S. Pat. No. 5,070,355 to Inoue et al., hereby incorporated by reference). According to one embodiment, steps may be taken that generally reduce the occurrences of a pre-flash that may otherwise be used when warranted. In another embodiment, the use of pre-flash is eliminated altogether. In this embodiment, the red-eye phenomenon in a miniature camera with an integral strobe or flash is eliminated and/or prevented without using a pre-flash, preferably through post-processing, red-eye elimination procedures as described above.

The use of meta-data for the post-processing of digital images has been described above in accordance with a preferred embodiment (see also US Publ. Pat. App. No. 2003/0058349 to Takemoto). Meta-data contained in a digital image may be analyzed, as may be referred to as EXIF tags, or simply tags, and utilizing such information, global post-processing may be performed on the image to adjust the image tone, sharpness and/or color balance. Another way to use meta-data is in the photo-finishing industry, where a digital image may be post-processed to optimize the output from a printing system. Examples of this use of meta-data are provided at U.S. Pat. Nos. 6,505,003 6,501,911 and 6,496, 655 to Mallory Desormeaux, hereby incorporated by reference. A hybrid camera may be used which saves a copy of the original image containing meta-data and implements a scheme which allows control over saving the image containing metadata outside the camera. Image meta-data may also be recorded onto a standard camera film and the meta-data may be subsequently recovered to assist in the post-processing of the film (see U.S. Pat. No. 6,429,924 to Milch, hereby incorporated by reference). Advantageously in accordance with a preferred embodiment, image meta-data may be used to determine a size range of objects and related features within an image, in addition to the correction of global parameters such as image tone, sharpness and color balance.

A red-eye correction procedure may begin with detecting a human face in a digital image and, based on this detection, finding the eyes in the face (see, e.g., U.S. Pat. No. 6,252,976 to Schildkraut and Gray, U.S. Publ. Pat. App. No. 2003/0044070 to Fuersich et al., and U.S. Pat. No. 6,278,491 to Wang and Zhang, which are incorporated by reference). This procedure may preferably begin with detecting one or more face regions of a person or persons in a digital image, followed by detecting an eye region or eye regions in each face, and finally determining if red-eye defects exist in the subject's eyes. In the '976 patent, a complex procedure is described for detecting faces and balanced eye-pairs from a skin-map of the image. This task involves several partitioning and re-scaling operations. Significant additional processing of a potential face region of the image then follows in order to determine if a matching pair of eyes is present. Finally, the image pixels in the detected eye regions go through a complex scoring process to determine if a red-eye defect is present.

In a preferred process, a simplified and thus generally less resource intensive, image processing technique is used relative to those described at the '976 and '491 patents which detect face and eye regions in an image and subsequently verify the presence of red-eye defects. An advantageous technique will preferably not weight too heavily upon detecting balanced eye pairs, as this approach can get complex and resource intensive when two or more facial regions overlap or are in close proximity to one another in a digital image. According to a preferred embodiment herein, metadata is used to simplify the detection of red-eye defects in a digital image. For example, one or more exclusion criteria may be employed to determine that no flash was used (see also U.S. Publ. Pat. App. No. 2003/0044063 to Meckes et al.).

A range of alternative techniques may be employed to detect and verify the existence of red-eye defects in an image (see, e.g., U.S. Publ. Pat. Apps. No. 2003/0044177 and 2003/0044178 to Oberhardt et al., hereby incorporated by reference). A camera may include software or firmware for automatically detecting a red-eye image using a variety of image characteristics such as image brightness, contrast, the presence of human skin and related colors. The analysis of these image characteristics may be utilized, based on certain predetermined statistical thresholds, to decide if red-eye defects exist and if a flash was used to take the original image. This technique may be applied to images captured on conventional film, which is then digitally scanned, or to initially digitally-acquired images. Preferably, metadata is used that can be generated by a digital camera or otherwise recorded in or associated with the body of a digital image initially captured or scanned. In accordance with a preferred embodiment, meta-data an/or anthropometric data may be used to validate the existence of a red-eye defect in an image.

Further techniques may be used alternatively to the preferred embodiments described above for removing flash artifacts from digital images. Two copies of a digital image may be captured, one taken with flash illumination and a second taken without flash illumination, and intensity histograms of the two images may be compared in order to locate regions of the image where flash artifacts occur and correct these by reducing intensities in these regions (see, e.g., US Publ. Pat. App. No. 2002/0150306 to Baron). Specular reflections may be removed due to the flash and red-eye can be reduced in this way. However, even Baron recognizes that the technique may involve the setting of separate thresholds for each of the RGB image colors. A technique such as this will generally further involve use of some additional knowledge of the captured image if it is to be relied upon for correctly locating and identifying red-eye defects.

Another technique may involve the identification of small specular reflections that occur in the eye region when flash illumination is used (see, e.g., WO 03/026278 to Jarman, which is hereby incorporated by reference). This procedure may be used to detect red-eye defects without first detecting a human face or eye region. It is preferred, however, to use camera-specific information, or other image metadata such as acquisition data, or anthropometric data, or a combination thereof, to assist in the confirmation of a red-eye defect.

Digital cameras can also be customized using demographic groups (see, e.g., U.S. Publ. Pat. App. No. 2003/0025811 to Keelan et al., hereby incorporated by reference). The rationale for this technique is that certain aspects of image processing and the image acquisition process such as color and tone balance may be affected by both age-related and racial factors. It is also noted that both racial and age factors can affect the level of red-eye defects, which occur, and thus the pre-flash algorithms and flash-to-lens spacing for a digital camera may be adjusted according to the target market group based on age and nationality. Human faces may be detected and classified according to the age of the subjects (see, e.g., U.S. Pat. No. 5,781,650 to Lobo et al.). A number of image processing techniques may be combined with anthropometric data on facial features to determine an estimate of the age category of a particular facial image. In a preferred embodiment, the facial features and/or eye regions are validated using anthropometric data within a digital image. The reverse approach may also be employed and may involve a probability inference, also known as Bayesian Statistics.

The preferred embodiments described herein may involve expanded digital acquisition technology that inherently involves digital cameras, but that may be integrated with other devices such as cell-phones equipped with an acquisition component, toy cameras etc. The digital camera or other image acquisition device of the preferred embodiment has the capability to record not only image data, but also additional data referred to as meta-data. The file header of an image file, such as JPEG, TIFF, JPEG-2000, etc., may include capture information such as whether a flash was used, the distance as recorded by the auto-focus mechanism, the focal length of the lens, the sensor resolution, the shutter and the aperture. The preferred embodiments described herein serve to improve the detection of red eyes in images, while eliminating or reducing the occurrence of false positives, and to improve the correction of the detected artifacts.

While an exemplary drawing and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention, as set forth in the claims below and structural and functional equivalents thereof.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, unless expressly set forth or understood by those skilled in the art being necessary.

What is claimed is:

1. Within a cell phone equipped with a digital camera, a method of filtering a red-eye phenomenon from a digital image acquired with said same cell phone equipped with said digital camera, said digital image comprising a multiplicity of pixels indicative of color, the pixels forming various shapes within the image, the method comprising:
    acquiring a digital image with said cell phone equipped with said digital camera;
    using a red eye filter stored within said cell phone equipped with said digital camera;
    analyzing, with said red eye filter, information describing conditions under which the image was acquired, and meta-data information including information specific to said digital camera component of said cell phone, including f-stop, aperture, exposure, gain, white balance, or color transformation, or combinations thereof; and
    based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

2. The method of claim 1, wherein said determining with said red eye filter whether one or more regions within said digital image are suspected as including red eye artifact comprises performing said shape analysis including determining whether one or both of an iris shape or an eyebrow line is found.

3. The method of claim 1, wherein said determining with said red eye filter whether one or more regions within said digital image are suspected as including red eye artifact comprises performing said color analysis including determining whether a white area is found.

4. The method of claim 1, further comprising analyzing pixel information within one or more regions suspected as including red eye artifact based on said analyzing of information describing conditions under which the image was acquired, and determining whether any of said one or more suspected regions continue to be suspected as including red eye artifact based on said pixel analysis, said pixel analysis being performed after said analyzing of information describing conditions under which the image was acquired.

5. The method of claim 1, further comprising analyzing pixel information within said digital image, and determining whether said one or more regions are suspected as including red eye artifact based on said pixel analysis, and wherein said pixel analysis is performed after said analyzing of information describing conditions under which the image was acquired.

6. The method of claim 1, further comprising obtaining anthropometrical information of human faces and said determining, based at least in part on said analyzing of information describing conditions under which the image was acquired, whether said regions are actual red eye artifact, being based further on said anthropometrical information.

7. The method of claim 1, wherein said filtering method is executed at least in part on said cell phone equipped with said digital camera.

8. The method of claim 1, wherein said filtering method is executed entirely on said cell phone equipped with said digital camera.

9. The method of claim 1, wherein said information describes conditions under which the image was acquired and comprises an indication of whether a flash was used when the image was acquired.

10. The method of claim 1, wherein said determining whether said regions are actual red eye artifact is performed within the cell phone equipped with the digital camera as a probability determination process based upon a plurality of criteria.

11. The method of claim 1, further comprising:
    adjusting a pixel color within any of said regions wherein red eye artifact is determined;
    outputting image data to an external device.

12. The method of claim 11, wherein said determining whether said regions are actual red eye artifact is performed within the cell phone equipped with the digital camera as a probability determination process based upon a plurality of criteria, and wherein the pixel color is adjusted within the external device.

13. The method of claim 1, wherein said performing shape analysis includes analyzing a combined shape of the red region and the first group of pixels in the vicinity of said red region.

14. The method of claim 1, wherein said first group of pixels substantially surrounds the red region.

15. One or more non-transitory processor-readable storage devices having embedded therein digital code for programming a processor to perform a method of filtering a red-eye phenomenon from a digital image that is acquired with a cell phone equipped with a digital camera and that includes a multiplicity of pixels indicative of color, the pixels forming various shapes within the image, wherein the method comprises:
    using a red eye filter stored within said cell phone equipped with said digital camera;
    analyzing, with said red eye filter, information describing conditions under which the image was acquired, and meta-data information including information specific to said camera component of said cell phone, including f-stop, aperture, exposure, gain, white balance or color transformation, or combinations thereof; and
    based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

16. The one or more non-transitory processor-readable storage devices of claim 15, wherein said determining with said red eye filter whether one or more regions within said digital image are suspected as including red eye artifact comprises performing said shape analysis including determining whether one or both of an iris shape or an eyebrow line is found.

17. The one or more non-transitory processor-readable storage devices of claim 15, wherein said determining with said red eye filter whether one or more regions within said digital image are suspected as including red eye artifact comprises performing said color analysis including determining whether a white area is found.

18. The one or more non-transitory processor-readable storage devices of claim 15, wherein the method further comprises analyzing pixel information within one or more regions suspected as including red eye artifact based on said analyzing of information describing conditions under which the image was acquired, and determining whether any of said one or more suspected regions continue to be suspected as including red eye artifact based on said pixel analysis, said pixel analysis being performed after said analyzing of information describing conditions under which the image was acquired.

19. The one or more non-transitory processor-readable storage devices of claim 15, wherein the method further comprises analyzing pixel information within said digital image, and determining whether said one or more regions are suspected as including red eye artifact based on said pixel analysis, and wherein said pixel analysis is performed after said analyzing of information describing conditions under which the image was acquired.

20. The one or more non-transitory processor-readable storage devices of claim 15, wherein the method further comprises obtaining anthropometrical information of human faces and said determining, based at least in part on said analyzing of information describing conditions under which the image was acquired, whether said regions are actual red eye artifact, being based further on said anthropometrical information.

21. The one or more non-transitory processor-readable storage devices of claim 15, wherein said filtering method is executed at least in part on said cell phone equipped with said digital camera.

22. The one or more non-transitory processor-readable storage devices of claim 15, wherein said filtering method is executed entirely on said cell phone equipped with said digital camera.

23. The one or more non-transitory processor-readable storage devices of claim 15, wherein said information describes conditions under which the image was acquired and comprises an indication of whether a flash was used when the image was acquired.

24. The one or more non-transitory processor-readable storage devices of claim 15, wherein said determining whether said regions are actual red eye artifact is performed within a digital camera as a probability determination process based upon a plurality of criteria.

25. The one or more non-transitory processor-readable storage devices of claim 15, wherein the method further comprises:
adjusting a pixel color within any of said regions wherein red eye artifact is determined;
and outputting image data to an external device.

26. The one or more non-transitory processor-readable storage devices of claim 25, wherein said determining whether said regions are actual red eye artifact is performed within a digital camera as a probability determination process based upon a plurality of criteria, and wherein the pixel color is adjusted within the printer.

27. The one or more non-transitory processor-readable storage devices of claim 15, wherein said performing shape analysis includes analyzing a combined shape of the red region and the first group of pixels in the vicinity of said red region.

28. The one or more non-transitory processor-readable storage devices of claim 15, wherein said first group of pixels substantially surrounds the red region.

29. A cell phone equipped with a digital camera, comprising:
a lens;
an image sensor;
a processor; and
a memory having program code embodied therein for programming the processor to perform a method of filtering a red-eye phenomenon from a digital image that is acquired with the cell phone equipped with said digital camera and that includes a multiplicity of pixels indicative of color, the pixels forming various shapes within the image, wherein the method comprises:
acquiring a digital image with said cell phone equipped with said digital camera;
analyzing within the cell phone equipped with said digital camera information describing conditions under which the image was acquired, and meta-data information including information specific to said camera component of said cell phone, including f-stop, aperture, exposure, gain, white balance or color transformation, or combinations thereof; and
based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

30. The cell phone of claim 29, wherein said determining with said red eye filter whether one or more regions within said digital image are suspected as including red eye artifact comprises performing said shape analysis including determining whether one or both of an iris shape or an eyebrow line is found.

31. The cell phone of claim 29, wherein said determining with said red eye filter whether one or more regions within said digital image are suspected as including red eye artifact comprises performing said color analysis including determining whether a white area is found.

32. The cell phone of claim 29, wherein the method further comprises analyzing pixel information within one or more regions suspected as including red eye artifact based on said analyzing of information describing conditions under which the image was acquired, and determining whether any of said one or more suspected regions continue to be suspected as including red eye artifact based on said pixel analysis, said pixel analysis being performed after said analyzing of information describing conditions under which the image was acquired.

33. The cell phone of claim 29, wherein the method further comprises analyzing pixel information within said digital image, and determining whether said one or more regions are suspected as including red eye artifact based on said pixel analysis, and wherein said pixel analysis is performed after said analyzing of information describing conditions under which the image was acquired.

34. The cell phone of claim 29, wherein the method further comprises obtaining anthropometrical information of human faces and said determining, based at least in part on said analyzing of information describing conditions under which the image was acquired, whether said regions are actual red eye artifact, being based further on said anthropometrical information.

35. The cell phone of claim 29, wherein said filtering method is executed within a portable image acquisition device, having no photographic film.

36. The cell phone of claim 29, wherein said filtering method is executed as a post-processing step on an external computation device.

37. The cell phone of claim 29, wherein said information describes conditions under which the image was acquired and comprises an indication of whether a flash was used when the image was acquired.

38. The cell phone of claim 29, wherein said determining whether said regions are actual red eye artifact is performed within a digital camera as a probability determination process based upon a plurality of criteria.

39. The cell phone of claim 29, wherein the method further comprises:
adjusting a pixel color within any of said regions wherein red eye artifact is determined; and
outputting image data to an external device.

40. The cell phone of claim 39, wherein said determining whether said regions are actual red eye artifact is performed within a digital camera as a probability determination process based upon a plurality of criteria, and wherein the pixel color is adjusted within the external device.

41. The cell phone of claim 29, wherein said performing shape analysis includes analyzing a combined shape of the red region and the first group of pixels in the vicinity of said red region.

42. The cell phone of claim 29, wherein said first group of pixels substantially surrounds the red region.

43. Within a cell phone equipped with a digital camera, a method of filtering a red-eye phenomenon from a digital image acquired with said same cell phone equipped with said digital camera, said digital image comprising a multiplicity of pixels indicative of color, the pixels forming various shapes within the image, the method comprising:
acquiring a digital image with said cell phone equipped with said digital camera;
using a red eye filter stored within said cell phone equipped with said digital camera;
analyzing, with said red eye filter, information describing conditions under which the image was acquired, and meta-data information including information specific to said camera component of said cell phone, including a spectral response curve of a sensor stored as a look-up table of an acquisition device with which the image was acquired; and
based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

44. The method of claim 43, wherein said determining with said red eye filter whether one or more regions within said digital image are suspected as including red eye artifact comprises performing said shape analysis including determining whether one or both of an iris shape or an eyebrow line is found.

45. The method of claim 43, wherein said determining with said red eye filter whether one or more regions within said digital image are suspected as including red eye artifact comprises performing said color analysis including determining whether a white area is found.

46. One or more non-transitory processor-readable storage devices having embedded therein digital code for programming a processor to perform a method of filtering a red-eye phenomenon from a digital image that was acquired by a cell phone equipped with a digital camera and that includes a multiplicity of pixels indicative of color, the pixels forming various shapes within the image, wherein the method comprises:
using a red eye filter stored within said cell phone equipped with said digital camera;
analyzing, with said red eye filter, information describing conditions under which the image was acquired, and meta-data information including information specific to said camera component of said cell phone, including a spectral response curve of a sensor stored as a look-up table of an acquisition device with which the image was acquired; and
based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

47. The one or more non-transitory processor-readable storage devices of claim 46, wherein said determining with said red eye filter whether one or more regions within said digital image are suspected as including red eye artifact comprises performing said shape analysis including determining whether one or both of an iris shape or an eyebrow line is found.

48. The one or more non-transitory processor-readable storage devices of claim 46, wherein said determining with said red eye filter whether one or more regions within said digital image are suspected as including red eye artifact comprises performing said color analysis including determining whether a white area is found.

49. A cell phone equipped with a digital camera, comprising:
a lens;
an image sensor;
a processor; and
a memory having program code embodied therein for programming the processor to perform a method of filtering a red-eye phenomenon from a digital image that was acquired with the cell phone equipped with said digital camera and that includes a multiplicity of pixels indicative of color, the pixels forming various shapes within the image, wherein the method comprises:
acquiring a digital image with said cell phone equipped with said digital camera;
analyzing within the device information describing conditions under which the image was acquired, and meta-data information including information specific to said camera component of said cell phone, including a spectral response curve of a sensor stored as a look-up table of the cell phone equipped with the digital camera with which the image was acquired; and
based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

50. The cell phone of claim 49, wherein said determining with said red eye filter whether one or more regions within said digital image are suspected as including red eye artifact comprises performing said shape analysis including determining whether one or both of an iris shape or an eyebrow line is found.

51. The cell phone of claim 49, wherein said determining with said red eye filter whether one or more regions within said digital image are suspected as including red eye artifact comprises performing said color analysis including determining whether a white area is found.

52. Within a cell phone equipped with a digital camera, a method of filtering a red-eye phenomenon from a digital image acquired with said same cell phone equipped with said digital camera, said digital image comprising a multiplicity of pixels indicative of color, the pixels forming various shapes within the image, the method comprising:
  acquiring a digital image with said cell phone equipped with said digital camera;
  using a red eye filter stored within said cell phone equipped with said digital camera;
  analyzing, with said red eye filter, information describing conditions under which the image was acquired and meta-data information including information specific to said camera component of said cell phone, aperture, f-stop, or spectral response curve of sensor, or combinations thereof; and
  based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

53. The method of claim 52, wherein said determining with said red eye filter whether one or more regions within said digital image are suspected as including red eye artifact comprises performing said shape analysis including determining whether one or both of an iris shape or an eyebrow line is found.

54. The method of claim 52, wherein said determining with said red eye filter whether one or more regions within said digital image are suspected as including red eye artifact comprises performing said color analysis including determining whether a white area is found.

55. One or more non-transitory processor-readable storage devices having embedded therein digital code for programming a processor to perform a method of filtering a red-eye phenomenon from a digital image acquired by a cell phone equipped with a digital camera that includes a multiplicity of pixels indicative of color, the pixels forming various shapes within the image, wherein the method comprises:
  using a red eye filter stored within said cell phone equipped with said digital camera;
  analyzing, with said red eye filter, information describing conditions under which the image was acquired, and meta-data information including information specific to said camera component of said cell phone, aperture, f-stop, or spectral response curve of sensor, or combinations thereof; and
  based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

56. The one or more non-transitory processor-readable storage devices of claim 55, wherein said determining with said red eye filter whether one or more regions within said digital image are suspected as including red eye artifact comprises performing said shape analysis including determining whether one or both of an iris shape or an eyebrow line is found.

57. The one or more non-transitory processor-readable storage devices of claim 55, wherein said determining with said red eye filter whether one or more regions within said digital image are suspected as including red eye artifact comprises performing said color analysis including determining whether a white area is found.

58. A cell phone equipped with a digital camera, comprising:
  a lens;
  an image sensor;
  a processor; and
  a memory having program code embodied therein for programming the processor to perform a method of filtering a red-eye phenomenon from a digital image acquired with the digital camera component of said cell phone that includes a multiplicity of pixels indicative of color, the pixels forming various shapes within the image, wherein the method comprises:
  acquiring a digital image with said cell phone equipped with said digital camera;
  analyzing within the cell phone equipped with said digital camera information describing conditions under which the image was acquired, and meta-data information including information specific to said digital camera component of said cell phone, aperture, f-stop, or spectral response curve of sensor, or combinations thereof; and
  based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

59. The cell phone of claim 58, wherein said determining with said red eye filter whether one or more regions within said digital image are suspected as including red eye artifact comprises performing said shape analysis including determining whether one or both of an iris shape or an eyebrow line is found.

60. The cell phone of claim 58, wherein said determining with said red eye filter whether one or more regions within said digital image are suspected as including red eye artifact comprises performing said color analysis including determining whether a white area is found.

61. Within a cell phone equipped with a digital camera, a method of filtering a red-eye phenomenon from a digital image acquired with said same cell phone equipped with said digital camera, said digital image comprising a multiplicity of pixels indicative of color, the pixels forming various shapes within the image, the method comprising:
  acquiring a digital image with said cell phone equipped with said digital camera;
  using a red eye filter stored within said cell phone equipped with said digital camera;
  analyzing, with said red eye filter, information describing conditions under which the image was acquired, and meta-data information including information specific to said camera component of said cell phone, aperture, f-stop, color transformation due to spectral response curve of sensor, or overall CCD size, or combinations thereof; and
  based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

62. The method of claim 61, wherein said determining with said red eye filter whether one or more regions within said digital image are suspected as including red eye artifact comprises performing said shape analysis including determining whether one or both of an iris shape or an eyebrow line is found.

63. The method of claim 61, wherein said determining with said red eye filter whether one or more regions within said digital image are suspected as including red eye artifact comprises performing said color analysis including determining whether a white area is found.

64. The method of claim 61, wherein said meta-data information comprises color transformation due to spectral response curve of sensor, or overall CCD size, or combinations thereof.

65. One or more non-transitory processor-readable storage devices having embedded therein digital code for programming a processor to perform a method of filtering a red-eye phenomenon from a digital image acquired by a cell phone equipped with a digital camera that includes a multiplicity of pixels indicative of color, the pixels forming various shapes within the image, wherein the method comprises:
 using a red eye filter stored within said cell phone equipped with said digital camera;
 analyzing, with said red eye filter, information describing conditions under which the image was acquired, and meta-data information including information specific to said camera component of said cell phone, including aperture, f-stop, color transformation due to spectral response curve of sensor, or overall CCD size, or combinations thereof; and
 based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

66. The one or more non-transitory processor-readable storage devices of claim 65, wherein said determining with said red eye filter whether one or more regions within said digital image are suspected as including red eye artifact comprises performing said shape analysis including determining whether one or both of an iris shape or an eyebrow line is found.

67. The one or more non-transitory processor-readable storage devices of claim 65, wherein said determining with said red eye filter whether one or more regions within said digital image are suspected as including red eye artifact comprises performing said color analysis including determining whether a white area is found.

68. The one or more non-transitory processor-readable storage devices of claim 65, wherein said meta-data information comprises color transformation due to spectral response curve of sensor, or overall CCD size, or combinations thereof.

69. A cell phone equipped with a digital camera, comprising:
 a lens;
 an image sensor;
 a processor; and
 a memory having program code embodied therein for programming the processor to perform a method of filtering a red-eye phenomenon from a digital image acquired with the device that includes a multiplicity of pixels indicative of color, the pixels forming various shapes within the image, wherein the method comprises:
 acquiring a digital image with said cell phone equipped with said digital camera;
 analyzing within the cell phone equipped with the digital camera information describing conditions under which the image was acquired, and meta-data information including information specific to said camera component of said cell phone, including aperture, f-stop, color transformation due to spectral response curve of sensor, or overall CCD size, or combinations thereof; and
 based at least in part on said analyzing, determining with said red eye filter whether one or more regions within said digital image are suspected as including red eye artifact, including one or both of performing shape analysis on a first group of pixels in the vicinity of a red region, or performing color analysis on the first group of pixels in the vicinity of the red region.

70. The cell phone of claim 69, wherein said determining with said red eye filter whether one or more regions within said digital image are suspected as including red eye artifact comprises performing said shape analysis including determining whether one or both of an iris shape or an eyebrow line is found.

71. The cell phone of claim 69, wherein said determining with said red eye filter whether one or more regions within said digital image are suspected as including red eye artifact comprises performing said color analysis including determining whether a white area is found.

72. The cell phone of claim 69, wherein said meta-data information comprises color transformation due to spectral response curve of sensor, or overall CCD size, or combinations thereof.

* * * * *